US011758440B2

(12) United States Patent
Lee et al.

(10) Patent No.: US 11,758,440 B2
(45) Date of Patent: Sep. 12, 2023

(54) BROADCAST OR MULTICAST SUPPORT FOR STANDALONE MODE

(71) Applicant: QUALCOMM Incorporated, San Diego, CA (US)

(72) Inventors: Kuo-Chun Lee, San Diego, CA (US); Brian Clarke Banister, San Diego, CA (US); Arvind Vardarajan Santhanam, San Diego, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,559

(22) Filed: Nov. 3, 2020

(65) Prior Publication Data

US 2021/0136631 A1 May 6, 2021

Related U.S. Application Data

(60) Provisional application No. 63/038,574, filed on Jun. 12, 2020, provisional application No. 62/931,107, filed on Nov. 5, 2019.

(51) Int. Cl.
*H04W 36/00* (2009.01)
*H04W 36/14* (2009.01)
*H04W 36/30* (2009.01)
*H04W 4/50* (2018.01)
*H04W 4/06* (2009.01)

(52) U.S. Cl.
CPC ......... *H04W 36/0007* (2018.08); *H04W 4/06* (2013.01); *H04W 4/50* (2018.02); *H04W 36/14* (2013.01); *H04W 36/305* (2018.08)

(58) Field of Classification Search
CPC ..... H04W 36/0007; H04W 4/06; H04W 4/50; H04W 36/14; H04W 36/305
See application file for complete search history.

(56) References Cited

U.S. PATENT DOCUMENTS

| 2014/0235242 | A1* | 8/2014 | Granzow | H04W 48/17 455/436 |
| 2014/0342740 | A1* | 11/2014 | Kim | H04W 36/14 455/437 |
| 2015/0163811 | A1* | 6/2015 | Konstantinou | H04W 76/16 370/329 |

(Continued)

OTHER PUBLICATIONS

International Search Report and Written Opinion—PCT/US2020/070745—ISA/EPO—dated May 27, 2021.

(Continued)

*Primary Examiner* — Margaret G Mastrodonato
(74) *Attorney, Agent, or Firm* — Harrity & Harrity, LLP

(57) ABSTRACT

Various aspects of the present disclosure generally relate to wireless communication. In some aspects, a user equipment (UE) may initiate a broadcast or multicast (broadcast/multicast) application associated with a first radio access technology (RAT) while the UE is in a standalone mode for a second RAT; switch from the second RAT to the first RAT based at least in part on initiating the broadcast/multicast application; and switch from the first RAT to the second RAT based at least in part on failing to detect a communication associated with the broadcast/multicast application using the first RAT. Numerous other aspects are provided.

26 Claims, 15 Drawing Sheets

(56) References Cited

U.S. PATENT DOCUMENTS

| | | |
|---|---|---|
| 2018/0288659 A1 | 10/2018 | Jamadagni et al. |
| 2019/0230569 A1* | 7/2019 | Kim ..................... H04W 88/16 |
| 2019/0274148 A1 | 9/2019 | Xiong et al. |
| 2020/0280827 A1* | 9/2020 | Fechtel .................. H04W 4/40 |
| 2021/0289430 A1* | 9/2021 | Hwang ................ H04W 60/00 |

OTHER PUBLICATIONS

Partial International Search Report—PCT/US2020/070745—ISA/EPO—dated Feb. 9, 2021.

\* cited by examiner

BROADCAST OR MULTICAST SUPPORT FOR STANDALONE MODE

CROSS-REFERENCE TO RELATED APPLICATION

This patent application claims priority to U.S. Provisional Patent Application No. 62/931,107, filed on Nov. 5, 2019, and to U.S. Provisional Patent Application No. 63/038,574, filed on Jun. 12, 2020, both entitled "BROADCAST OR MULTICAST SUPPORT FOR STANDALONE MODE," and both assigned to the assignee hereof. The disclosures of the prior applications are considered part of and are incorporated by reference into this patent application.

FIELD OF THE DISCLOSURE

Aspects of the present disclosure generally relate to wireless communication and specifically, to techniques and apparatuses for broadcast or multicast support for standalone mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G or 5G/NR, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A radio access technology (RAT), such as LTE, may provide a multimedia broadcast or multicast (broadcast/multicast) service (MBMS), such as evolved MBMS (eM-BMS). An MBMS communication may be transmitted to a set of UEs on a physical multicast channel (PMCH), or may be transmitted on a unicast channel to UEs that are to receive the MBMS communication. As 5G/NR is deployed, some UEs may use a combination of 5G/NR and LTE. For example, a UE may use a 5G standalone mode in which the UE is 5G-capable but not LTE-capable when 5G/NR coverage is satisfactory, and may use a non-standalone mode in which the UE is both LTE-capable and 5G-capable when 5G/NR coverage is not satisfactory. In some cases, an MBMS communication associated with a non-5G/NR RAT, such as LTE, may be provided for a UE that is in a 5G standalone mode. In such examples, the UE may fail to receive the MBMS communication because the MBMS communication is provided via a non-5G/NR network while the UE is in the 5G standalone mode, thereby reducing effectiveness of the MBMS communication and wasting network resources.

SUMMARY

In some aspects, a method of wireless communication, performed by a user equipment (UE), may include initiating a broadcast or multicast (broadcast/multicast) application associated with a first radio access technology (RAT) while the UE is in a standalone mode for a second RAT; switching from the second RAT to the first RAT based at least in part on initiating the broadcast/multicast application; and switching from the first RAT to the second RAT based at least in part on failing to detect a communication associated with the broadcast/multicast application using the first RAT.

In some aspects, a method of wireless communication, performed by a UE, may include initiating a broadcast/multicast application associated with a first RAT while the UE is in a standalone mode for a second RAT; determining whether a cell associated with the second RAT is identified by stored information indicating whether the cell is associated with broadcast/multicast coverage; and selectively performing a switch from the second RAT to the first RAT or cancelling the switch from the second RAT to the first RAT, based at least in part on whether the cell is identified by the stored information.

In some aspects, a UE for wireless communication may include memory and one or more processors operatively coupled to the memory. The memory and the one or more processors may be configured to initiate a broadcast/multicast application associated with a first RAT while the UE is in a standalone mode for a second RAT; switch from the second RAT to the first RAT based at least in part on initiating the broadcast/multicast application; and switch from the first RAT to the second RAT based at least in part on failing to detect a communication associated with the broadcast/multicast application using the first RAT.

In some aspects, a UE for wireless communication may include memory and one or more processors operatively coupled to the memory. The memory and the one or more processors may be configured to initiate a broadcast/multicast application associated with a first RAT while the UE is in a standalone mode for a second RAT; determine whether a cell associated with the second RAT is identified by stored information indicating whether the cell is associated with broadcast/multicast coverage; and selectively perform a switch from the second RAT to the first RAT or cancel the switch from the second RAT to the first RAT, based at least in part on whether the cell is identified by the stored information.

In some aspects, a non-transitory computer-readable medium may store one or more instructions for wireless communication. The one or more instructions, when executed by one or more processors of a UE, may cause the one or more processors to: initiate a broadcast/multicast application associated with a first RAT while the UE is in a standalone mode for a second RAT; switch from the second RAT to the first RAT based at least in part on initiating the broadcast/multicast application; and switch from the first RAT to the second RAT based at least in part on failing to detect a communication associated with the broadcast/multicast application using the first RAT.

In some aspects, a non-transitory computer-readable medium may store one or more instructions for wireless communication. The one or more instructions, when executed by one or more processors of a UE, may cause the one or more processors to: initiate a broadcast/multicast application associated with a first RAT while the UE is in a standalone mode for a second RAT; determine whether a cell associated with the second RAT is identified by stored information indicating whether the cell is associated with broadcast/multicast coverage; and selectively perform a switch from the second RAT to the first RAT or cancel the switch from the second RAT to the first RAT, based at least in part on whether the cell is identified by the stored information.

In some aspects, an apparatus for wireless communication may include means for initiating a broadcast/multicast application associated with a first RAT while the apparatus is in a standalone mode for a second RAT; means for switching from the second RAT to the first RAT based at least in part on initiating the broadcast/multicast application; and means for switching from the first RAT to the second RAT based at least in part on failing to detect a communication associated with the broadcast/multicast application using the first RAT.

In some aspects, an apparatus for wireless communication may include means for initiating a broadcast/multicast application associated with a first RAT while the UE is in a standalone mode for a second RAT; means for determining whether a cell associated with the second RAT is identified by stored information indicating whether the cell is associated with broadcast/multicast coverage; and means for selectively performing a switch from the second RAT to the first RAT or cancelling the switch from the second RAT to the first RAT, based at least in part on whether the cell is identified by the stored information.

In some aspects, a method of wireless communication, performed by a UE, may include initiating a broadcast/multicast application associated with a first RAT, the UE being in a standalone mode for a second RAT when the broadcast/multicast application is initiated; and switching from the second RAT to the first RAT based at least in part on initiating the broadcast/multicast application.

In some aspects, a UE for wireless communication may include memory and one or more processors operatively coupled to the memory. The memory and the one or more processors may be configured to initiate a broadcast/multicast application associated with a first RAT, the UE being in a standalone mode for a second RAT when the broadcast/multicast application is initiated; and switch from the second RAT to the first RAT based at least in part on initiating the broadcast/multicast application.

In some aspects, a non-transitory computer-readable medium may store one or more instructions for wireless communication. The one or more instructions, when executed by one or more processors of a UE, may cause the one or more processors to: initiate a broadcast/multicast application associated with a first RAT, the UE being in a standalone mode for a second RAT when the broadcast/multicast application is initiated; and switch from the second RAT to the first RAT based at least in part on initiating the broadcast/multicast application.

In some aspects, an apparatus for wireless communication may include means for initiating a broadcast/multicast application associated with a first RAT, the apparatus being in a standalone mode for a second RAT when the broadcast/multicast application is initiated; and means for switching from the second RAT to the first RAT based at least in part on initiating the broadcast/multicast application.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
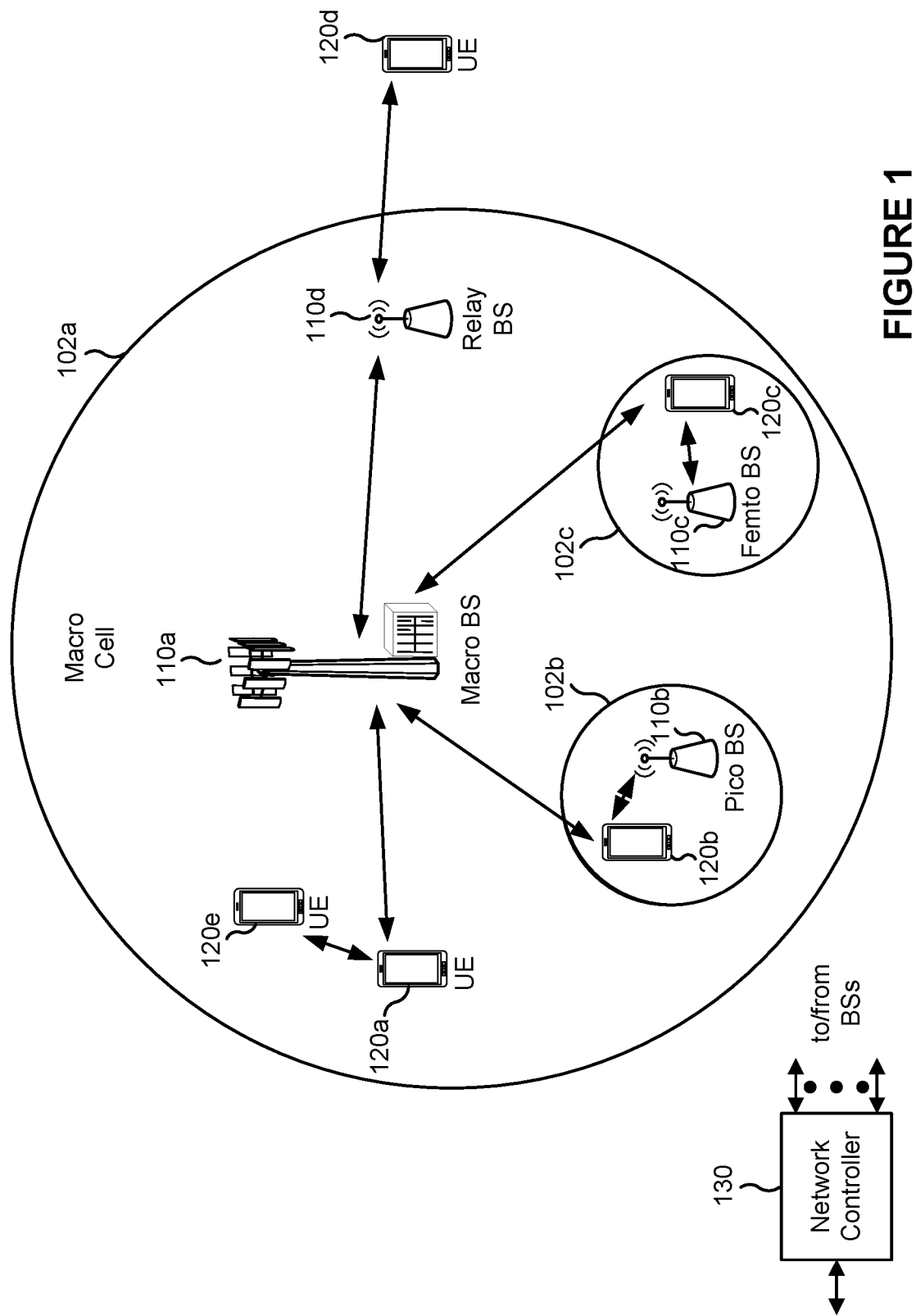
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Broadcast or multicast (broadcast/multicast) transmissions may be useful for broad dissemination of information, such as emergency alerts or audio or video content, among many other possibilities. Examples of broadcast/multicast services include the multimedia broadcast/multicast service (MBMS) and the evolved MBMS (eMBMS). "MBMS," "eMBMS," and "broadcast/multicast communication" may be used interchangeably herein. MBMS may be implemented using a particular radio access technology (RAT), such as LTE. In such a case, the UE may switch to a first RAT (such as 4G/LTE) from a second RAT (such as 5G/NR) so that the UE can receive a broadcast/multicast communication. However, in some cases, when connected to the 5G/NR network in the 5G standalone mode, the UE may be incapable of receiving a broadcast/multicast communication associated with an LTE RAT, since the UE may be 5G-capable and not LTE-capable when in the 5G standalone mode. Furthermore, in some cases, the UE may switch to a RAT on which the broadcast/multicast communication is not occurring or has not yet begun.

Some techniques and apparatuses described herein provide a UE with a capability to switch to a first RAT (such as 4G/LTE) from a second RAT (such as 5G/NR) so that the UE can receive a broadcast/multicast communication. For example, the UE may determine that a broadcast/multicast application has initiated (or the UE may initiate the broadcast/multicast application) and may switch from the second RAT to the first RAT based at least in part on initiating the broadcast/multicast application or determining that the broadcast/multicast application has been initiated. This may be achieved using various approaches, which are described below in connection with FIGS. 3-5.

In this way, reception of a broadcast/multicast service may be achieved by switching from a 5G standalone mode to a frequency associated with 4G/LTE, or by enabling a non-standalone mode or a 4G standalone mode, thereby improving compatibility between the broadcast/multicast service and 5G/NR, and conserving resources of the 5G/NR network that would otherwise be used to unicast or otherwise communicate the broadcast/multicast content on the 5G/NR network.

Some techniques and apparatuses described herein provide a UE with a capability to switch to a first RAT for a broadcast/multicast communication, then return to a second RAT if the broadcast/multicast communication is not received, as described in connection with FIGS. 6 through 10. For example, the UE may switch to 4G/LTE for a broadcast/multicast communication. If the UE does not receive system information associated with the broadcast/multicast communication within a timer length, the UE may return to 5G/NR. In some aspects, the UE may periodically switch between the first RAT and the second RAT. In some aspects, the UE may determine whether to switch to the first RAT, or may determine a timer length, based at least in part on stored information indicating cells associated with broadcast/multicast communications.

In this way, the UE may improve throughput by reducing time spent using the first RAT when no multicast/broadcast communication is received on the first RAT. This may be particularly beneficial when the second RAT is associated with higher throughput than the first RAT. Furthermore, in some aspects, the UE may conserve network resources and UE resources that would otherwise be used to switch to the first RAT when no broadcast/multicast communication is present on the first RAT.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110*a*, BS 110*b*, BS 110*c*, and BS 110*d*) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
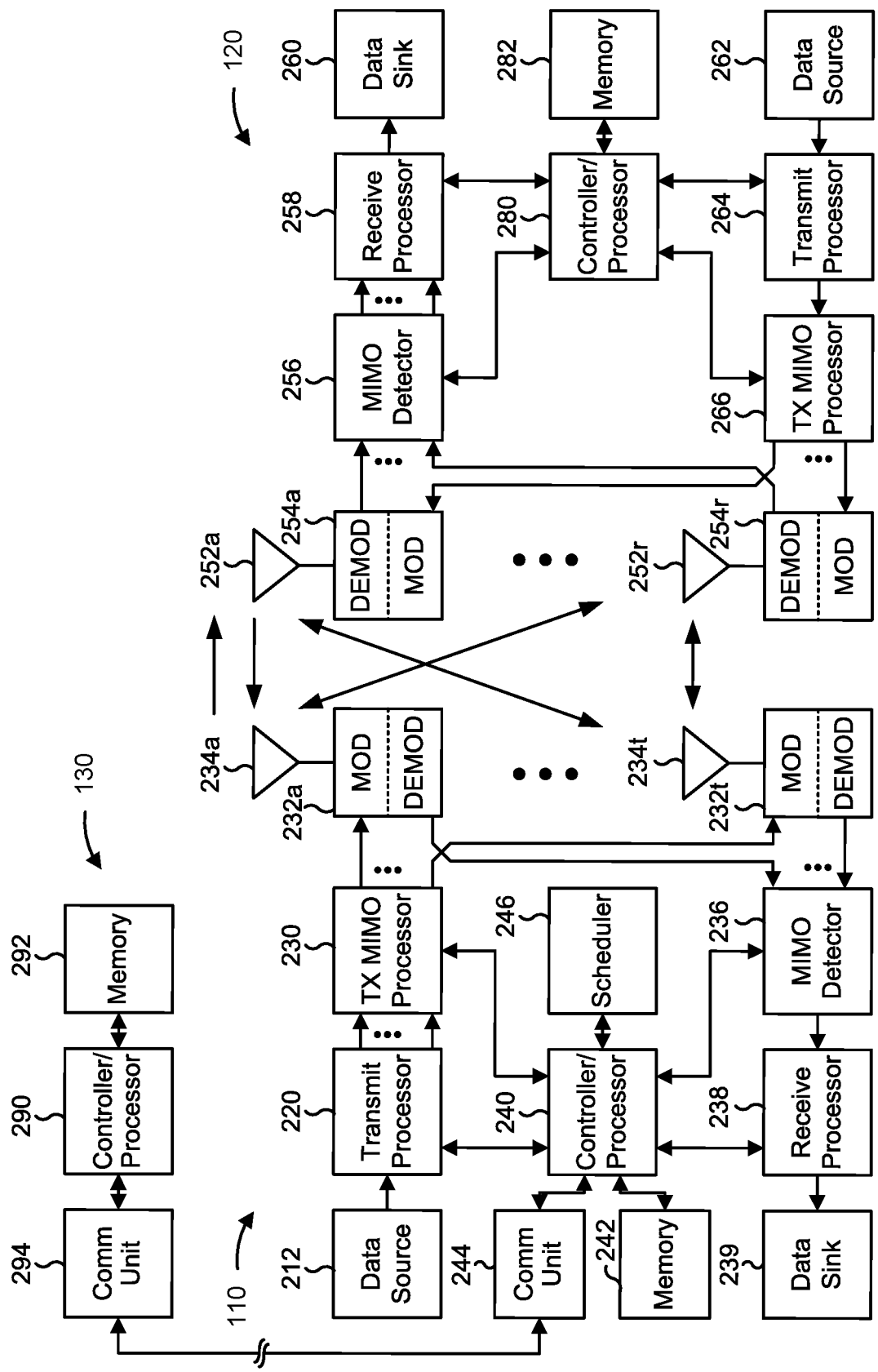
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with broadcast or multicast support for standalone mode, as described in more detail elsewhere herein. For example, controller/processor 240 of base station 110, controller/processor 280 of UE 120, or any other component(s) of FIG. 2 may perform or direct operations of, for example, the process of FIG. 8, the process of FIG. 9, or other processes as described herein. Memories 242 and 282 may store data and program codes for base station 110 and UE 120, respectively. A scheduler 246 may schedule UEs for data transmission on the downlink or uplink.

In some aspects, UE 120 may include means for initiating a broadcast or multicast (broadcast/multicast) application associated with a first radio access technology (RAT), the UE being in a standalone mode for a second RAT when the broadcast/multicast application is initiated; means for switching from the second RAT to the first RAT based at least in part on initiating the broadcast/multicast application; means for switching from the first RAT to the second RAT based at least in part on failing to detect a communication associated with the broadcast/multicast application using the first RAT; means for initiating a broadcast/multicast application associated with a first RAT, the UE being in a standalone mode for a second RAT when the broadcast/multicast application is initiated; means for determining that a cell associated with the second RAT is not identified by stored information indicating whether the cell is associated with broadcast/multicast coverage; means for determining whether a cell associated with the second RAT is identified by stored information indicating whether the cell is associated with broadcast/multicast coverage; means for cancelling a switch from the second RAT to the first RAT based at least in part on determining that the cell is not identified by the stored information; means for selectively performing a switch from the second RAT to the first RAT or cancelling the switch from the second RAT to the first RAT, based at least in part on whether the cell is identified by the stored information; means for initiating a broadcast or multicast (broadcast/multicast) application associated with a first RAT, the UE being in a standalone mode for a second RAT when the broadcast/multicast application is initiated; means for switching from the second RAT to the first RAT based at least in part on initiating the broadcast/multicast application; means for unblocking a public land mobile network (PLMN) of the second RAT based at least in part on determining that the broadcast/multicast application is no longer in use; means for providing an indication to deactivate the broadcast/multicast application based at least in part on determining that system information for the broadcast/multicast application is not received within a time window after initiating the broadcast/multicast application; means for monitoring for system information for the broadcast/multicast application on a network associated with the first RAT after switching from the second RAT to the first RAT; means for transmitting a broadcast/multicast interest indication to a base station associated with the first RAT based at least in part on detecting a temporary mobile group identity; means for triggering a tracking area update that indicates to enable a New Radio access mode or that indicates a New Radio capability after the broadcast/multicast application is deactivated and after switching from the second RAT to the first RAT; means for switching from the first RAT to the second RAT based at least in part on the broadcast/multicast application being deactivated; means for switching from the first RAT to the second RAT based at least in part on an out-of-service state, a radio link failure state, or a high-priority mobile network search; means for receiving, from a base station associated with the second RAT, system information that indicates a frequency, of the first RAT, associated with a broadcast/multicast service; means for switching to the second RAT; means for remaining on the first RAT; means for storing mapping information identifying a broadcast/multicast service associated with the first RAT and a corresponding cell identifier associated with the second RAT, where the mapping information is stored based at least in part on detecting system information identifying the broadcast/multicast service while covered by a cell associated with the corresponding cell identifier; means for identifying the broadcast/multicast service associated with the corresponding cell identifier using the mapping information; among other examples, or combinations thereof. In some aspects, such means may include one or more components of UE 120 described in connection with FIG. 2.

As noted above, broadcast/multicast transmissions may be useful for broad dissemination of information, such as emergency alerts or audio or video content, among many other possibilities. Examples of broadcast/multicast services include the multimedia broadcast/multicast service (MBMS) and the evolved MBMS (eMBMS). MBMS may be implemented using a particular RAT, such as LTE. As 5G/NR networks are deployed, some UEs may operate in a 5G standalone mode, where a UE connects only to a 5G/NR base station (as compared to a non-standalone mode where the UE connects to a 4G/LTE base station and a 5G/NR base station). However, when connected to the 5G/NR network in the 5G standalone mode, the UE may be unable to receive a broadcast/multicast communication associated with an LTE RAT, because the UE may be 5G-active and not LTE-active when in the 5G standalone mode.

In such a case, the UE may switch to a first RAT (such as 4G/LTE) from a second RAT (such as 5G/NR) so that the UE can receive a broadcast/multicast communication. For example, the UE may determine that a broadcast/multicast application has been initiated (or may initiate the broadcast/multicast application) and may switch from the second RAT to the first RAT based at least in part on initiating the broadcast/multicast application or determining that the broadcast/multicast application has been initiated. This may be achieved using various approaches, which are described elsewhere herein. However, in some cases, when connected to the 5G/NR network in the 5G standalone mode, the UE may be incapable of receiving a broadcast/multicast communication associated with an LTE RAT, since the UE may be 5G-capable and not LTE-capable when in the 5G standalone mode. Furthermore, in some cases, the UE may switch to a RAT on which the broadcast/multicast communication is not occurring or has not yet begun. In such examples, performance and data throughput of the UE may be negatively impacted by switching from a RAT associated with a higher data rate or more advanced features (such as 5G/NR) to a RAT associated with the broadcast/multicast communication (such as 4G/LTE).

Some techniques and apparatuses described herein provide a UE with a capability to switch to a first RAT (such as 4G/LTE) from a second RAT (such as 5G/NR) so that the UE can receive a broadcast/multicast communication. For example, the UE may determine that a broadcast/multicast application has initiated (or may initiate the broadcast/multicast application) and may switch from the second RAT to the first RAT based at least in part on initiating the broadcast/multicast application or determining that the broadcast/multicast application has been initiated. This may be achieved using various approaches, which are described below in connection with FIGS. 3 through 5. Thus, usage of a broadcast/multicast service by switching from a 5G standalone mode to a frequency associated with 4G/LTE, or by enabling a non-standalone mode or a 4G standalone mode, may be enabled, thereby improving compatibility between the broadcast/multicast service and 5G/NR, and conserving resources of the 5G/NR network that would otherwise be used to unicast or otherwise communicate the broadcast/multicast content on the 5G/NR network.

Some techniques and apparatuses described herein provide a UE with a capability to switch to a first RAT for a broadcast/multicast communication, then return to a second RAT if the broadcast/multicast communication is not received, as described in connection with FIGS. 6 through 10. For example, the UE may switch to 4G/LTE for a broadcast/multicast communication. If the UE does not receive system information associated with the broadcast/multicast communication within a timer length, the UE may return to 5G/NR. In some aspects, the UE may periodically switch between the first RAT and the second RAT. In some aspects, the UE may determine whether to switch to the first RAT, or may determine a timer length, based at least in part on stored information indicating cells associated with broadcast/multicast communications.

In this way, the UE may improve throughput by reducing time spent using the first RAT when no multicast/broadcast communication is received on the first RAT. This may be particularly beneficial when the second RAT is associated with higher throughput than the first RAT. Furthermore, in some aspects, the UE may conserve network resources and UE resources that would otherwise be used to switch to the first RAT when no broadcast/multicast communication is present on the first RAT.

Figure 3:
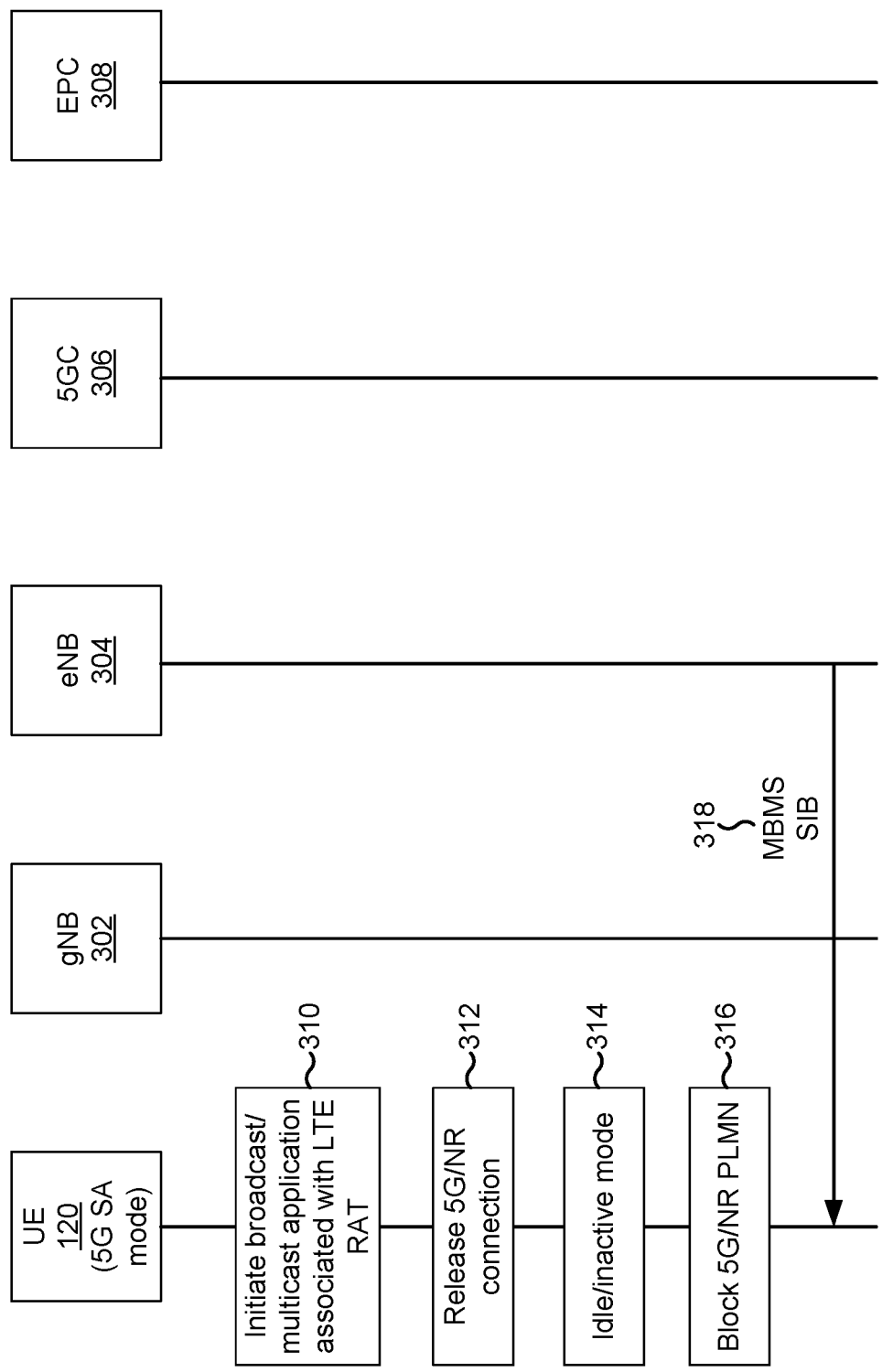
FIG. 3 is a diagram illustrating an example of broadcast or multicast support in a 5G standalone mode, in accordance with various aspects of the present disclosure.

FIG. 3 is a diagram illustrating an example of broadcast or multicast support in a 5G standalone mode, in accordance with various aspects of the present disclosure. As shown, FIG. 3 includes a UE 120 in a 5G standalone (SA) mode. In a 5G SA mode, the UE 120 may be capable of communicating on a 5G/NR RAT and not another RAT (e.g., a 4G/LTE RAT). For example, the UE 120 may be in the 5G standalone mode at a start of the process shown in FIG. 3. As further shown, FIG. 3 includes a gNB 302 (which may be associated with a BS 110 associated with a 5G/NR RAT), an eNB 304 (which may be associated with a BS 110 associated with a 4G/LTE RAT), a 5G core network (5GC) 306 (such as an access and mobility management function (AMF), a session management function, a user plane function, a policy control function, an application function, or another device or function of the 5G core network), and an evolved packet core (EPC) 308 (such as a home subscriber service, a gateway, a mobility management entity, or another device or function of the evolved packet core). In some examples, gNB 302 and eNB 304 may be implemented using a same base station. For example, a single base station may include a gNB function and an eNB function. In some other examples, gNB 302 and eNB 304 may be implemented using separate base stations.

As shown in FIG. 3, in a first operation 310, the UE 120 may initiate a broadcast/multicast application associated with the LTE RAT. For example, a user of UE 120 may launch the broadcast/multicast application, UE 120 may receive (such as from gNB 302 or eNB 304) an indication that the broadcast/multicast application is to be launched, or may receive a notification that a broadcast/multicast application is to be received, among other examples. In some aspects, the UE 120 may determine that a periodic broadcast/multicast communication is to be received (such as in accordance with a semi-persistently scheduled communication). In some aspects, the UE 120 may determine that an application has requested to use a broadcast/multicast service.

In a second operation 312, the UE 120 may locally release a 5G/NR connection. For example, the UE 120 may be associated with the 5G/NR connection because the UE 120 is in the 5G standalone mode. In some aspects, the UE 120 may locally release the 5G/NR connection when the UE is in a connected mode with reference to the 5G/NR RAT, such as when the UE 120 is associated with an active or established radio resource control (RRC) connection with the gNB 302.

In a third operation 314, the UE 120 may enter an idle mode (such as an RRC idle mode) or an inactive mode (such as an RRC inactive mode) when the connection is released. In some aspects, the UE 120 may be in the idle mode or the inactive mode at the start of the process described in connection with FIG. 3. For example, the UE 120 may not be associated with an active connection with the gNB 302 when the broadcast/multicast application is initiated. In such a case, the UE 120 may not release the active connection (because no such connection exists).

In a fourth operation 316, the UE 120 may block a 5G/NR public land mobile network (PLMN). For example, the UE 120 may block a PLMN identifier of the 5G/NR network associated with the gNB 302 or may block a set of PLMN identifiers that are associated with 5G/NR networks. In some aspects, the UE 120 may move to 4G/LTE based at least in part on blocking the 5G/NR PLMN. For example, the UE 120 may fall back to the 4G/LTE RAT, may move to a frequency associated with the 4G/LTE RAT, may fall back to a non-standalone mode with 4G/LTE connectivity and 5G/NR connectivity, or may switch from the 5G/NR RAT to the LTE RAT. In this way, the UE 120 may prepare to receive the broadcast/multicast communication after the broadcast/multicast application is initiated.

In a fifth operation 318, the UE 120 may receive a broadcast/multicast system information block (SIB), such as an MBMS SIB, an eMBMS SIB, or the like. The broadcast/multicast SIB may include, for example, SIB type 13 (SIB13), SIB type 15 (SIB15), or a similar SIB that conveys MBMS information, as defined by a 3GPP technical specification. SIB13 may carry MBMS control information, and SIB15 may carry an MBMS service area identifier. In some aspects, the UE 120 may monitor for the broadcast/multicast SIB based at least in part on switching back to the 4G/LTE RAT.

In some aspects, the UE 120 may monitor for the broadcast/multicast SIB based at least in part on a timer. For example, the UE 120 may start the timer at launch of the broadcast/multicast application or based at least in part on launching the broadcast/multicast application. The UE 120 may determine whether a broadcast/multicast SIB is received before expiration of the timer. If no broadcast/multicast SIB is received before expiration of the timer, the UE 120 may deactivate (for example, close, end, shut down, etc.) the broadcast/multicast application, or may provide an indication for a user to deactivate the broadcast/multicast application. In this way, the UE 120 may reduce the impact of switching to 4G/LTE when no broadcast/multicast communication is to be provided to the UE 120.

In some aspects, the UE 120 may unblock the NR PLMN. For example, the UE 120 may unblock the NR PLMN based at least in part on the broadcast/multicast application being deactivated or based at least in part on determining that the broadcast/multicast application is deactivated. Thus, the UE 120 may reduce the impact of falling back to 4G/LTE after the broadcast/multicast application is closed.

In some aspects, the UE 120 may transmit an interest indication, such as an MBMS interest indication, to the eNB 304. For example, the UE 120 may transmit the interest indication when the UE 120 receives a particular temporary mobile group identity, which may indicate that the UE 120 is being configured to receive an MBMS bearer service. The interest indication may cause the eNB 304 to keep the UE 120 at a same frequency on the 4G/LTE network, rather than changing a frequency of the UE 120 or switching the UE 120 back to the 5G/NR network.

Figure 4:
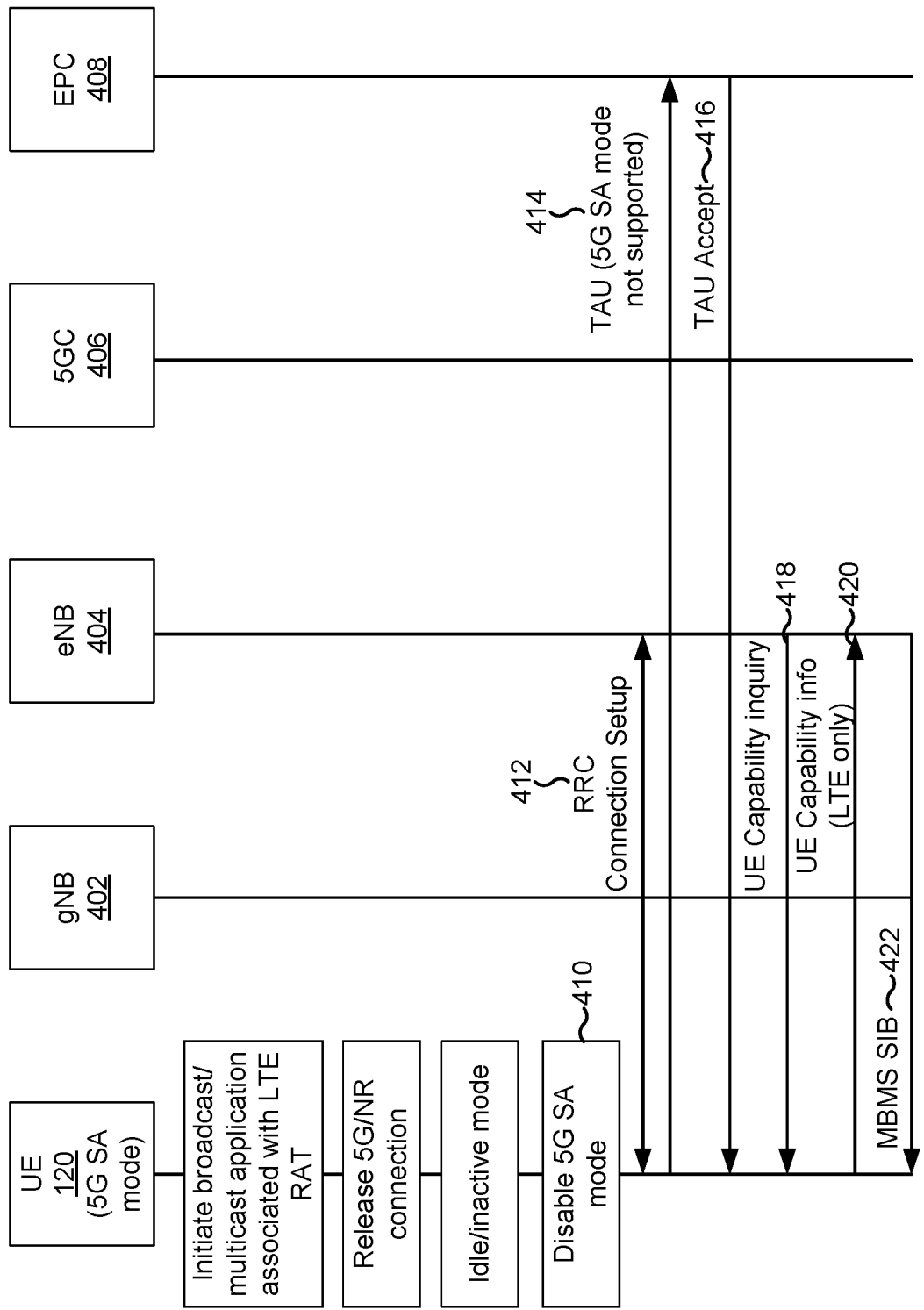
FIG. 4 is a diagram illustrating another example of broadcast or multicast support in a 5G standalone mode, in accordance with various aspects of the present disclosure.

FIG. 4 is a diagram illustrating another example of broadcast/multicast support in a 5G standalone mode, in accordance with various aspects of the present disclosure. As shown, FIG. 4 includes a UE 120 in a 5G SA mode. For example, the UE 120 may be in the 5G standalone mode at a start of the process shown in FIG. 4. As further shown, FIG. 4 includes a gNB 402 (such as a BS 110 associated with a 5G/NR RAT or gNB 302), an eNB 404 (such as a BS 110 associated with a 4G/LTE RAT or eNB 304), a 5G core network (5GC) 406 (such as an access and mobility management function (AMF), a session management function, a user plane function, a policy control function, an application function, or another device or function of the 5G core network, or 5GC 306), and an evolved packet core (EPC) 408 (such as a home subscriber service, a gateway, a mobility management entity, or another device or function of the EPC, or EPC 308).

As shown in FIG. 4, the UE 120 may initiate a broadcast/multicast application, release a 5G/NR connection (if a 5G/NR connection is active), and enter an idle or inactive (idle/inactive) mode, as described in more detail in connection with operations 310, 312 and 314, respectively, of FIG. 3. In a first operation 410, the UE 120 may disable a 5G standalone mode based at least in part on initiating the broadcast/multicast application. For example, the UE 120 may disable an N1 mode, which is a mode allowing access to the 5GC 406 via gNB 402. This may cause the UE 120 to move to the 4G/LTE RAT or establish a connection with eNB 404, such as an RRC connection, as shown in the second operation 412.

In a third operation 414, the UE 120 may perform a tracking area update (TAU) with the EPC 408. For example, the UE 120 may trigger the TAU. As further shown, the TAU may include information indicating that the 5G SA mode is not supported by the UE. In a fourth operation 416, the UE may receive a TAU accept from the EPC 408 (such as via the eNB 404).

In a fifth operation 418, the UE 120 may receive a UE capability inquiry from eNB 404. In a sixth operation 420, the UE may provide UE capability information (such as radio capability information or other such information) that indicates that the UE 120 is not capable of using 5G/NR for standalone mode (and may be still capable of using 5G non-standalone mode) or that the UE 120 is capable of using only 4G/LTE. Thus, the UE 120 may prevent being switched back to 5G/NR while the broadcast/multicast communication is received.

In a seventh operation 422, the UE 120 may monitor for an MBMS SIB from the eNB 404, as described in more detail in connection with the operation 318 of FIG. 3. Thus, the UE 120 may switch to 4G/LTE in order to receive a broadcast/multicast communication based at least in part on the MBMS SIB. In some aspects, the UE 120 may switch back to the 5G/NR RAT (such as by reactivating the NR SA mode, reactivating the N1 mode, or providing capability information (such as UE capability information, 5G/NR capability information, or radio capability information) indicating that the UE 120 is capable of using the 5G/NR RAT in association with a TAU), or may provide an indication for a user to deactivate the broadcast/multicast application, based at least in part on a timer, as is also described in more detail in connection with FIG. 3.

Figure 5:
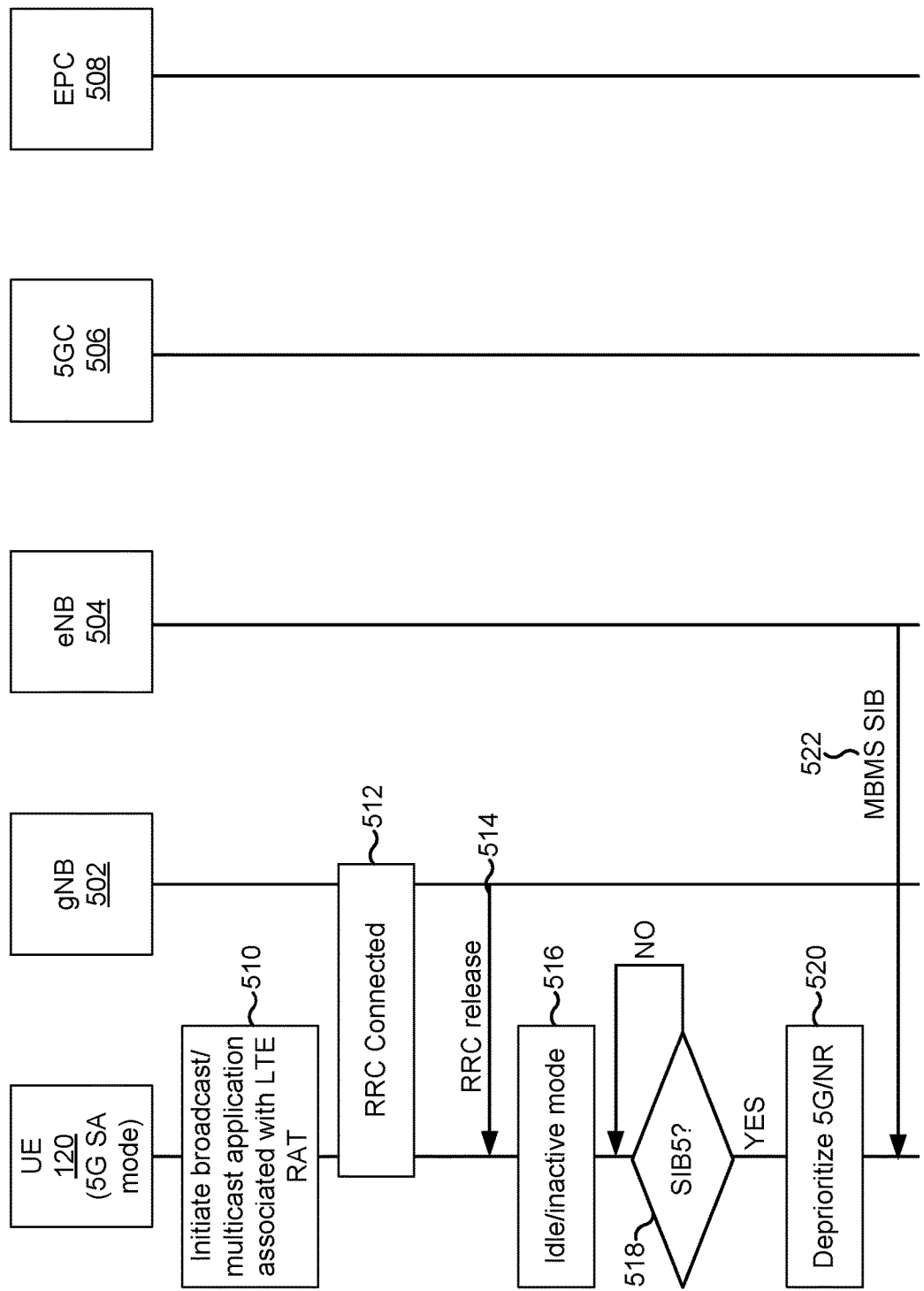
FIG. 5 is a diagram illustrating yet another example of broadcast or multicast support in a 5G standalone mode, in accordance with various aspects of the present disclosure.

FIG. 5 is a diagram illustrating yet another example of broadcast/multicast support in a 5G standalone mode, in accordance with various aspects of the present disclosure. As shown, FIG. 5 includes a UE 120 in a 5G standalone mode. For example, the UE 120 may be in the 5G standalone mode at a start of the process shown in FIG. 5. As further shown, FIG. 5 includes a gNB 502 (such as a BS 110 associated with a 5G/NR RAT or gNB 302/402), an eNB 504 (such as a BS 110 associated with a 4G/LTE RAT or eNB 304/404), a 5G core network (5GC) 506 (such as an access and mobility management function (AMF), a session management function, a user plane function, a policy control function, an application function, or another device or function of the 5G core network, or 5GC 306/406), and an evolved packet core (EPC) 508 (such as a home subscriber service, a gateway, a mobility management entity, or another device or function of the evolved packet core, or EPC 308/408).

As shown in FIG. 5, in a first operation 510, the UE 120 may initiate a broadcast/multicast application associated with the LTE RAT. In a second operation 512, the UE 120 may be in a connected mode, such as an RRC CONNECTED mode, with the gNB 502. In a third operation 514, the gNB 502 may release the connection with the UE 120. For example, the gNB 502 may release the connection based at least in part on an end of a data communication with the UE 120 or an indication from the UE 120 to release the connection, among other possibilities. Accordingly, in a fourth operation 516, the UE 120 may enter an idle mode or an inactive mode.

In a fifth operation 518, the UE 120 may determine whether NR SIBS is received. SIBS may provide information regarding inter-frequency cell reselection, and may indicate that the UE can reselect from an NR network to an LTE network. As shown, in response to the UE 120 receiving SIBS or determining that SIBS is received (operation 518—YES), the UE 120 may deprioritize 5G/NR in a sixth operation 520. For example, the UE 120 may assign a priority level to 5G/NR that is lower than a priority level associated with the 4G/LTE RAT. As non-limiting examples, the priority level of 5G/NR may be assigned as 0 (zero) or a negative number. This may ensure that the UE 120 reselects to, and remains reselected to, the 4G/LTE RAT in order to receive the broadcast/multicast communication. In a seventh operation 522, the UE 120 may monitor for or receive the MBMS SIB, as described in more detail in connection with the operations 318 and 422 of FIGS. 3 and 4, respectively. In some aspects, the UE 120 may use a timer to monitor for the MBMS SIB or switch back to the 5G/NR RAT, as described in more detail in connection with FIGS. 3 and 4. In some aspects, the UE 120 may transmit an MBMS interest indication to avoid switching back to the 5G/NR RAT, which also is described in more detail in connection with FIGS. 3 and 4.

In some aspects, the UE 120 may assign a priority level to the 5G/NR RAT that is greater than zero. For example, the UE 120 may undo the deprioritization of the 5G/NR RAT or otherwise increase the prioritization of the 5G/NR RAT. This reprioritization may be based at least in part on determining that the broadcast/multicast application is closed, based at least in part on closing the broadcast/multicast application, performing cell reselection. Furthermore this reprioritization may be based at least in part on determining that the broadcast/multicast application is closed, based at least in part on closing the broadcast/multicast application, determining that the 4G/LTE RAT is out of service (OOS) or associated with radio link failure (RLF), performing an RLF recovery search, performing a high priority PLMN search (in association with a roaming state of the UE), or another trigger or condition. Thus, the UE 120 may revert to the 5G SA mode by reprioritizing the 5G/NR RAT.

In some aspects, the UE 120 may perform the operations described in connection with FIG. 3, 4, or 5 based at least in part on a SIB received via gNB 302/402/502. For example, the SIB may include information indicating a neighbor LTE frequency associated with an MBMS, one or more service area identities associated with the LTE frequency, or the like. The UE 120 may trigger the operations described in connection with FIG. 3, 4, or 5, when the SIB is received on a current cell of the UE 120, and when the UE 120 is associated with a service that is interested in a service area identity indicated by the SIB. Thus, the UE 120 may identify a relevant MBMS based at least in part on receiving a SIB via the 5G/NR network.

In some aspects, the UE 120 may start a timer when the broadcast/multicast application is deactivated (for example, after receiving a broadcast/multicast communication or determining that SIB13 or SIB15 is not detected). If the broadcast/multicast application is not re-launched before expiry of the timer, then the UE 120 may perform one or more operations described in connection with FIG. 3, 4, or 5 such as reprioritizing 5G/NR, switching back to the 5G/NR RAT, or the like. If the broadcast/multicast application is re-launched before the expiry of the timer, then the UE 120 may reset the timer. The timer may prevent the UE 120 from ping-ponging between the 4G/LTE RAT and the 5G/NR RAT, thereby conserving resources of the UE 120, the eNB, and the gNB.

In some aspects, the UE 120 may store information identifying service area indicators of broadcast/multicast services. For example, the UE 120 may detect an LTE SIB, such as SIB15 or the like, and may store information identifying an LTE frequency on which the SIB was detected, one or more service area indicators identified by the SIB, and the corresponding 5G/NR cell global identity (CGI) associated with the UE 120 when the SIB was detected. The UE 120 may use this information to identify a broadcast/multicast service based at least in part on which 5G/NR CGI the UE 120 is in coverage. For example, the UE 120 may identify, based at least in part on a correspondence between a 5G/NR CGI and a service area indicator, the service area indicator associated with the UE 120's location, and may identify the LTE frequency associated with the service area indicator. Thus, the UE 120 may identify available broadcast/multicast services without switching from 5G/NR to LTE to perform a search for a SIB identifying available broadcast/multicast services.

FIGS. 6 through 10 are diagrams illustrating examples of techniques for switching between RATs in connection with a broadcast or multicast communication, in accordance with various aspects of the present disclosure. As shown, FIGS. 6 through 10 include a UE 120 in a 5G SA mode. For example, the UE 120 may be in the 5G standalone mode at a start of the operations shown in FIGS. 6 through 10. As further shown, FIGS. 6 through 10 include a gNB 602 (such as a BS 110 associated with a 5G/NR RAT) and an eNB 604 (such as a BS 110 associated with a 4G/LTE RAT). In some aspects, gNB 602 and eNB 604 may be implemented using a same base station. For example, a single base station may include a gNB function and an eNB function. In some aspects, gNB 602 and eNB 604 may be implemented using separate base stations.

Figure 6:
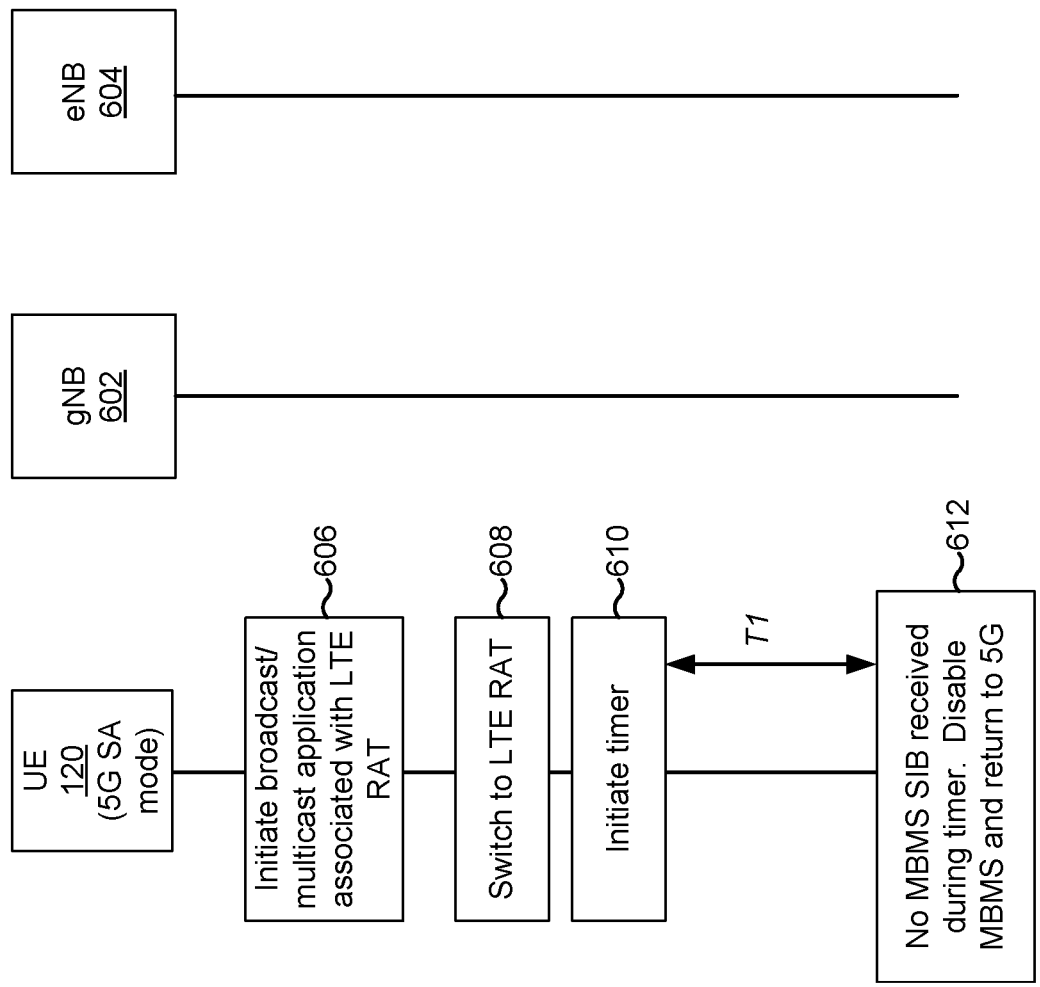
FIGS. 6 through 10 are diagrams illustrating examples of techniques for switching between radio access technologies (RATs) in connection with a broadcast or multicast communication, in accordance with various aspects of the present disclosure.

FIG. 6 shows an example where UE 120 switches to an LTE RAT for a broadcast/multicast communication, then switches back to an NR RAT based at least in part on a timer. As shown in FIG. 6, in a first operation 606, the UE 120 may initiate a broadcast/multicast application associated with the LTE RAT. For example, a user may launch the broadcast/multicast application, and UE 120 may receive (such as from gNB 602 or eNB 604) an indication that the broadcast/multicast application is to be launched, or may receive a notification that a broadcast/multicast application is to be received. In some aspects, the UE 120 may determine that a periodic broadcast/multicast communication is to be received (such as in accordance with a semi-persistently scheduled communication). In some aspects, the UE 120 may determine that an application has requested to use a broadcast/multicast service.

In a second operation 608, the UE 120 may switch to the LTE RAT. The UE 120 may use any technique to switch to the LTE RAT, such as blocking a PLMN identity of the NR RAT, disabling an N1 mode or a 5G NR capability of the UE 120, or lowering a cell reselection priority of NR frequencies, as described in connection with FIGS. 3, 4, and 5.

In a third operation 610, the UE 120 may initiate a timer. For example, the UE 120 may initiate the timer based at least in part on switching to the LTE RAT. Here, the timer has a length T1. T1 may define a length of time such as a time threshold. If the UE 120 does not receive an MBMS SIB in the length of time identified by T1, the UE 120 may perform one or more actions, described below. T1 may be determined by the UE 120, configured by the gNB 602 or the eNB 604, specified in a telecommunications standard, or otherwise indicated to the UE.

In a fourth operation 612, the UE 120 may determine that no MBMS SIB is received in a length of time defined by the timer. Accordingly, the UE 120 may perform one or more operations. Here, the UE 120 disables MBMS and returns to 5G. As used herein, an MBMS SIB refers to system information associated with a broadcast/multicast communication, such as a SIB15, a SIB13, or similar system information.

In some aspects, the UE 120 may provide a notification based at least in part on determining that no MBMS SIB is received in the time period. For example, a modem of the UE 120 may provide the notification to an application associated with the broadcast/multicast communication. In some aspects, the application may provide a notification for a user associated with the application, such as a notification that the UE 120 may lose 5G coverage if MBMS is not disabled for the UE 120. In such examples, the UE 120 may receive an interaction to cause the UE 120 to disable MBMS, which may cause the UE 120 to return to the NR RAT.

In some aspects, the UE 120 may disable MBMS based at least in part on determining that no MBMS SIB is received in the time period. In such examples, the UE 120 may return to the NR RAT. In some aspects, the UE 120 may disable the MBMS application, or may provide a notification that the UE 120 has disabled MBMS. In such examples, the UE 120 may receive an interaction, such as a user interaction, to cause the UE 120 to re-enable MBMS and re-attempt to receive the broadcast/multicast communication.

In this way, the UE 120 may move to a first RAT to receive an MBMS communication, may determine that the MBMS communication is not received within a time period, and may accordingly move back to a second RAT. This may improve throughput based at least in part on the second RAT being associated with higher throughput than the first RAT, and may reduce crowding on the first RAT.

Figure 7:
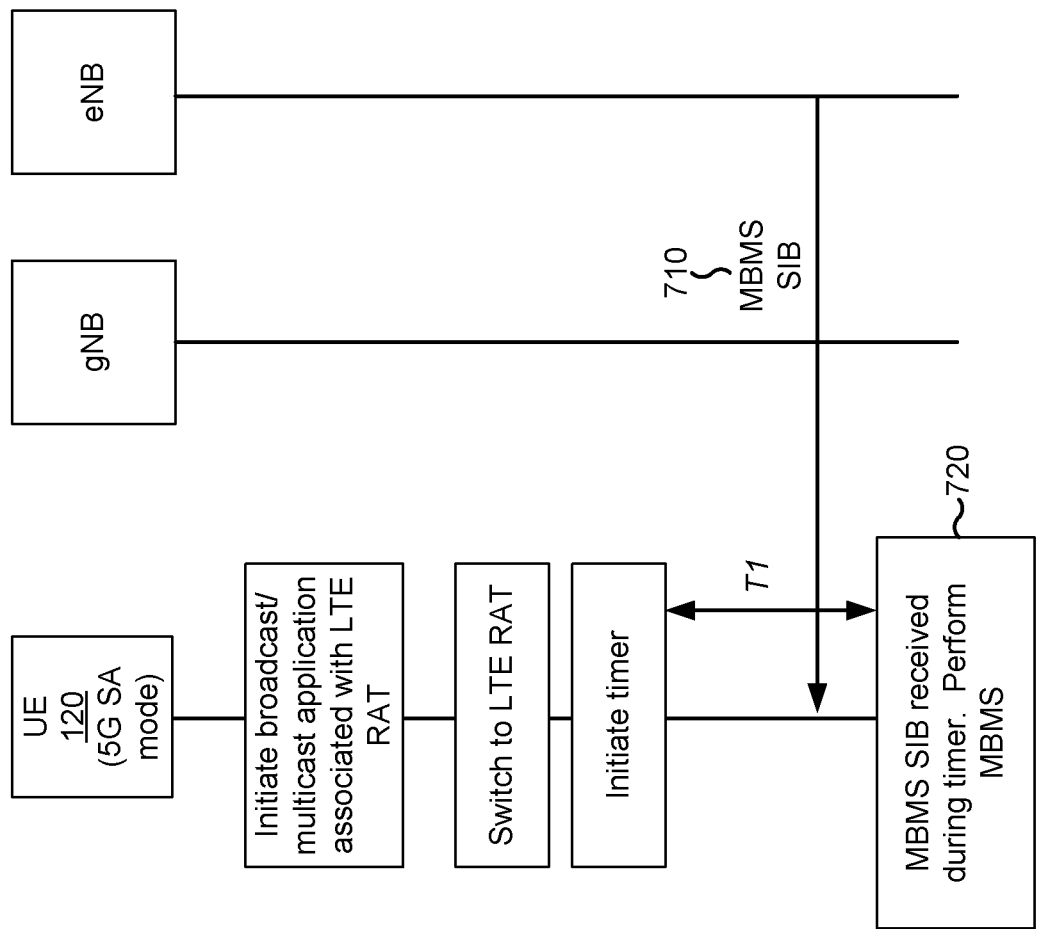

FIG. 7 shows an example where the UE 120 receives the MBMS SIB. As shown in FIG. 7, the UE 120 may initiate a broadcast/multicast application associated with the LTE RAT, may switch to the LTE RAT, and may initiate the timer T1. In a first operation 710, the UE 120 may receive an MBMS SIB before expiration of the time period associated with the timer T1. Accordingly, in a second operation 720, the UE 120 may perform the broadcast/multicast communication.

Figure 8:
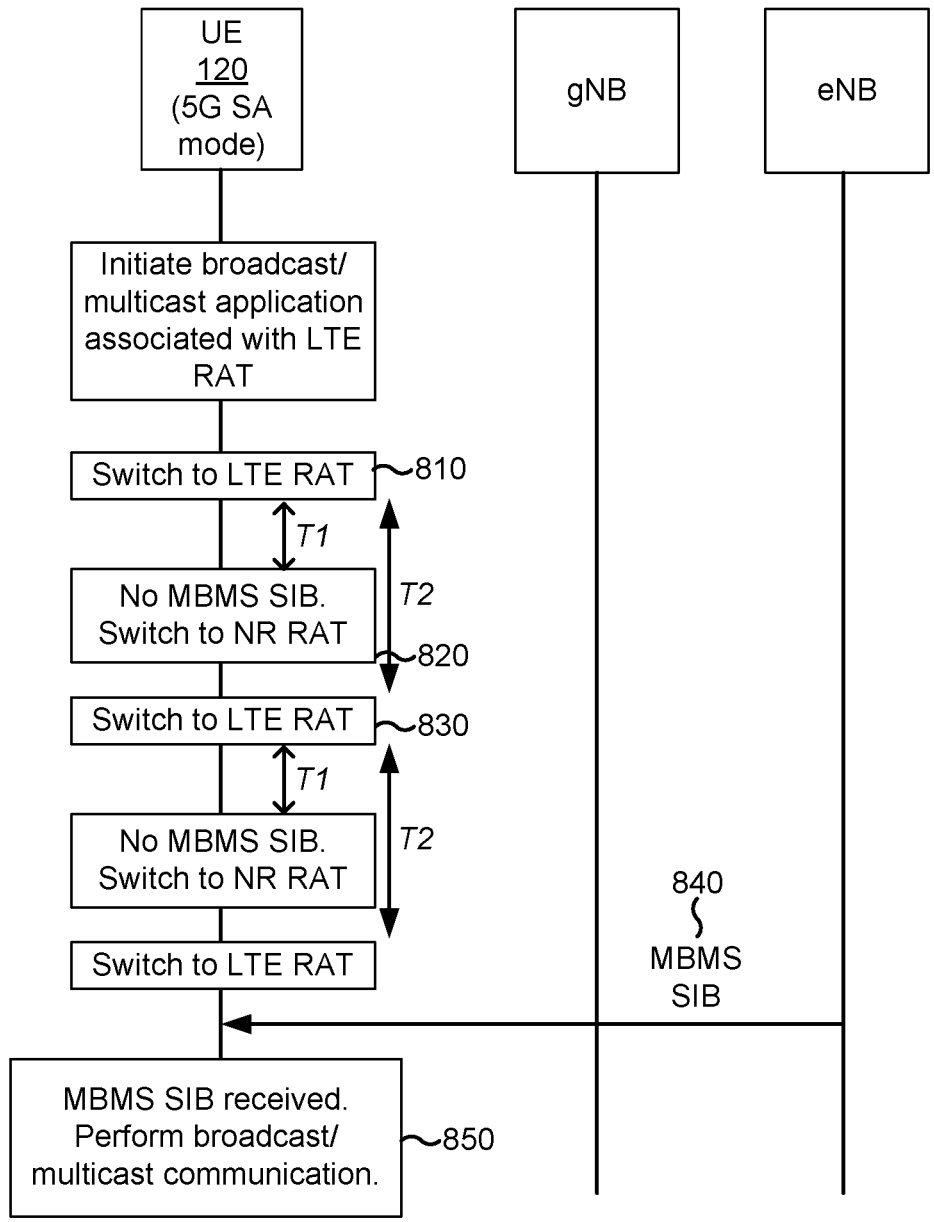

FIG. 8 shows an example where the UE 120 switches between the LTE RAT and the NR RAT based at least in part on a timer T2. As shown in FIG. 8, the UE 120 may initiate a broadcast/multicast application associated with the LTE RAT. Accordingly, in a first operation 810, the UE 120 may switch to the LTE RAT. This operation is described elsewhere herein.

In a second operation 820, the UE 120 may determine that the UE 120 has not received an MBMS SIB, and may accordingly switch to the NR RAT. For example, the UE 120 may determine that the MBMS SIB has not been received within a threshold time (such as the timer value T1, which was described in connection with FIGS. 6 and 7), and may accordingly switch to the NR RAT. Thus, the UE 120 may use the higher data rates and throughput of the NR RAT when the MBMS SIB is not received.

In a third operation 830, after expiration of a timer T2, the UE 120 may switch back to the LTE RAT. T2 may identify a length of time such as a time threshold. The length of time may start at a time associated with the UE 120 switching to an LTE RAT, such as a time associated with the first operation 810 or the third operation 830. If the UE 120 does not receive an MBMS SIB within T1, then the UE 120 may switch back to the NR RAT until the length of time identified by T2 has elapsed.

The UE 120 may switch back to the LTE RAT in order to perform the broadcast/multicast communication. If the UE 120 does not receive an MBMS SIB on the LTE RAT within the threshold time associated with T1, then the UE 120 may switch back to the NR RAT until the expiration of T2, as shown in FIG. 8.

In a fourth operation 840, the UE 120 may receive an MBMS SIB while the UE 120 is using the LTE RAT. Accordingly, in a fifth operation 850, the UE 120 may perform the broadcast/multicast communication.

By switching between the LTE RAT and the NR RAT in accordance with the timer T2, the UE 120 may experience improved throughput on the NR RAT while periodically checking for the MBMS SIB on the LTE RAT. Thus, the UE 120 may perform the broadcast/multicast communication once the MBMS SIB is received without having to remain on the LTE RAT continuously until the MBMS SIB is received. This may improve throughput and resource utilization of the UE 120.

In some aspects, the UE 120 may switch between the LTE and NR RATs based at least in part on a cell change, a mobility event, a timing advance change, or a similar event. For example, the UE 120 may switch to the LTE RAT, may determine that no MBMS SIB is received, and may switch back to the NR RAT. Thereafter, the UE 120 may switch to a different NR cell, and may switch back to the LTE RAT to determine whether an MBMS SIB is received. This may be beneficial because switching cells implies different cell coverage, and a new LTE cell of the UE 120 may provide the MBMS SIB. Furthermore, switching based at least in part on the cell change, the mobility event, or the timing advance change may conserve computing resources relative to switching based at least in part on the timer, because switches may be performed less frequently.

Figure 9:
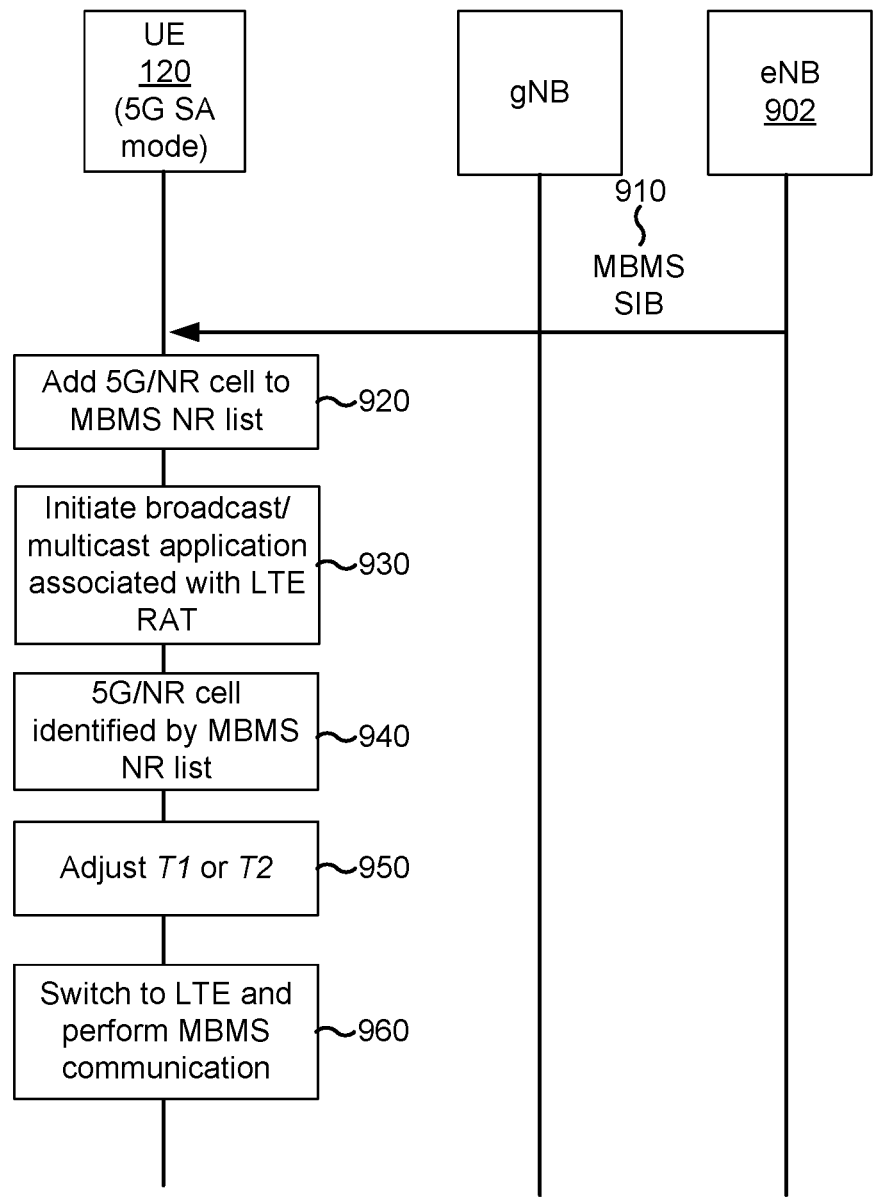
Figure 10:
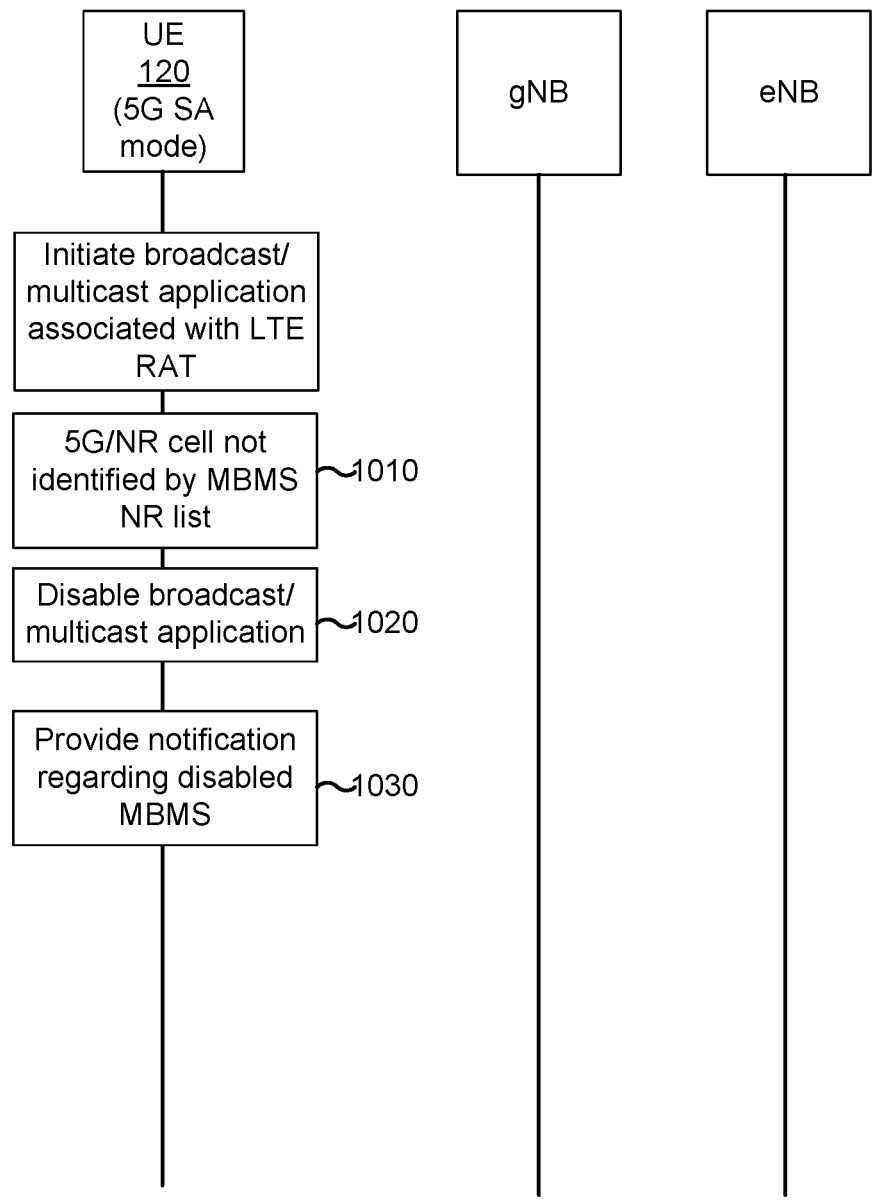

FIGS. 9 and 10 show examples where the UE 120 uses stored information to determine whether the UE 120 should switch to the LTE RAT to receive a broadcast/multicast communication. As shown in FIG. 9, in a first operation 910, the UE 120 may receive an MBMS SIB from an eNB 902. For example, the UE 120 may perform a broadcast/multicast communication with the eNB 902, or may receive the MBMS SIB without performing the broadcast/multicast communication. In a second operation 920, the UE 120 may add information identifying a 5G/NR cell of the UE 120 to an MBMS NR list. For example, the information identifying the 5G/NR cell may include a cell global identity associated with the 5G/NR cell, a geographical identifier associated with the 5G/NR cell, or another identity.

In the case described above, the MBMS NR list identifies 5G/NR cells that are associated with MBMS SIBs. In other words, the MBMS NR list identifies 5G/NR cells that are associated with coverage areas that are also at least partially covered by an LTE cell that provides an MBMS SIB. In some aspects, the MBMS NR list may identify 5G/NR cells that are not associated with MBMS SIBs. For example, the MBMS NR list may identify 5G/NR cells that are associated with coverage areas in which the UE 120 did not receive an MBMS SIB via an LTE cell.

In a third operation 930, the UE 120 may initiate a broadcast/multicast application associated with the LTE RAT. This operation is described in more detail elsewhere herein.

In a fourth operation 940, the UE 120 may determine that the 5G/NR cell of the UE 120 is identified by the MBMS NR list. For example, the UE 120 may determine that a cell global identity of the 5G/NR cell is identified by the MBMS NR list. In the case when the MBMS NR list identifies 5G/NR cells that are not associated with MBMS, then the UE 120 may determine that the 5G/NR cell associated with the UE 120 is not identified by the MBMS NR list.

In a fifth operation 950, the UE 120 may adjust timer values associated with one or more of T1 and T2. T1 is described in more detail in connection with FIGS. 6 and 7, and T2 is described in more detail in connection with FIG. 8. In some aspects, the UE 120 may lengthen T1 or shorten T2 if the UE 120 is in a 5G/NR cell identified by the MBMS NR list as being associated with MBMS coverage. In some aspects, the UE 120 may shorten T1 or lengthen T2 if the UE 120 is in a 5G/NR cell that is not identified by the MBMS NR list as being associated with MBMS coverage, or if the UE 120 is in a 5G/NR cell that is identified by the MBMS NR list as not being associated with MBMS coverage. Thus, the UE 120 may modify values of T1 and T2 based at least in part on whether an MBMS SIB is expected on a cell. Modifying the values of T1 and T2 may reduce the occasions of switching between the LTE RAT and the NR RAT, or may reduce the amount of time spent on the LTE RAT, thereby improving throughput and conserving computing resources.

In some aspects, the UE 120 may adjust a timer value based at least in part on a session start time associated with the broadcast/multicast communication. For example, the UE 120 may shorten T2 as the session start time approaches, and may lengthen T2 after the session start time has passed. Thus, the UE 120 may more frequently search for the broadcast/multicast communication before the session start time, and may less frequently search for the broadcast/multicast communication after the session start time. This may conserve computing resources associated with switching RATs and searching for the broadcast/multicast communication at a baseline or constant frequency.

In a sixth operation 960, the UE 120 may switch to the LTE RAT and may perform the broadcast/multicast communication. For example, the UE 120 may switch to the LTE RAT based at least in part on the 5G/NR cell of the UE 120 being identified by the MBMS NR list. In some aspects, the UE 120 may apply one or more of the techniques described by FIGS. 6 through 8 when performing the broadcast/multicast communication.

FIG. 10 shows an example where the 5G/NR cell of the UE 120 is not identified by the MBMS NR list. For example, in a first operation 1010, the UE 120 determines that the 5G/NR cell of the UE 120 is not identified by the MBMS NR list of 5G/NR cells that are associated with MBMS coverage. In some aspects, the UE 120 may determine that the 5G/NR cell of the UE 120 is identified by a list of 5G/NR cells that are not associated with MBMS coverage.

In a second operation 1020, the UE 120 may disable the broadcast/multicast application, thereby preventing the UE 120 from switching to the LTE RAT for the broadcast/multicast communication associated with the broadcast/multicast application. In some aspects, the UE 120 may provide a notification regarding the broadcast/multicast application, as shown by the third operation 1030. For example, a modem of the UE 120 may provide the notification to an application of the UE 120, or the UE 120 may provide the notification for display. In such a case, the UE 120 may disable the broadcast/multicast application automatically or based at least in part on an interaction to cause the UE 120 to disable the broadcast/multicast application. Thus, the UE 120 may conserve computing resources that would otherwise be used to switch to the LTE RAT when no broadcast/multicast application is likely to be performed. This may also increase throughput of the UE 120, because the UE 120 can remain on the NR RAT.

Figure 11:
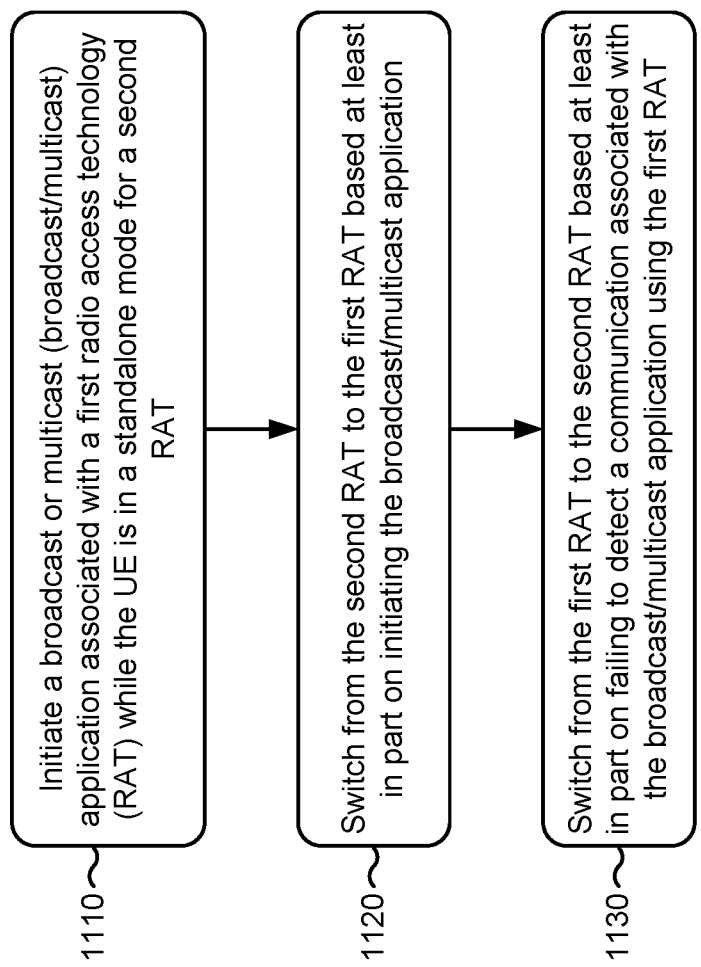
FIG. 11 shows a flowchart illustrating an example process performed by a UE in accordance with various aspects of the present disclosure.

FIG. 11 shows a flowchart illustrating an example process performed, for example, by a UE in accordance with various aspects of the present disclosure. The example process shown in FIG. 11 is an example where a UE (for example, UE 120) performs operations relating to switching between RATs in connection with a broadcast or multicast communication.

As shown in FIG. 11, in some aspects, the process may include initiating a broadcast/multicast application associated with a first RAT while the UE is in a standalone mode for a second RAT (block 1110). For example, the UE (for example, using antenna 252, DEMOD 254, MIMO detector 256, receive processor 258, or controller/processor 280) may initiate a broadcast/multicast application associated with a first RAT while the UE is in a standalone mode for a second RAT, as described above.

As shown in FIG. 11, in some aspects, the process may include switching from the second RAT to the first RAT based at least in part on initiating the broadcast/multicast application (block 1120). For example, the UE (for example, using antenna 252, DEMOD 254, MIMO detector 256, receive processor 258, or controller/processor 280) may switch from the second RAT to the first RAT based at least in part on initiating the broadcast/multicast application, as described above.

As shown in FIG. 11, in some aspects, the process may include switching from the first RAT to the second RAT based at least in part on failing to detect a communication associated with the broadcast/multicast application using the first RAT (block 1130). For example, the UE (for example, using antenna 252, DEMOD 254, MIMO detector 256, receive processor 258, or controller/processor 280) may switch from the first RAT to the second RAT based at least in part on failing to detect a communication associated with the broadcast/multicast application using the first RAT, as described above.

The process may include additional aspects, such as any single aspect or any combination of aspects described below or in connection with one or more other processes described elsewhere herein.

In a first additional aspect, failing to detect a communication associated with the broadcast/multicast application using the first RAT comprises failing to detect a system information block associated with the broadcast/multicast application using the first RAT.

In a second additional aspect, alone or in combination with the first aspect, switching from the first RAT to the second RAT based at least in part on failing to detect a communication associated with the broadcast/multicast application using the first RAT comprises switching from the first RAT to the second RAT based at least in part on failing to detect the communication within a defined time period.

In a third additional aspect, alone or in combination with one or more of the first and second aspects, a length of the defined time period is based at least in part on stored information indicating whether a cell that covers the UE and is associated with the second RAT is associated with broadcast/multicast coverage.

In a fourth additional aspect, alone or in combination with one or more of the first through third aspects, switching from the first RAT to the second RAT is based at least in part on receiving an interaction associated with the notification.

In a fifth additional aspect, alone or in combination with one or more of the first through fourth aspects, the notification is provided by a modem of the UE to an application or user interface of the UE.

In a sixth additional aspect, alone or in combination with one or more of the first through fifth aspects, the process includes providing a notification based at least in part on switching from the first RAT to the second RAT.

In a seventh additional aspect, alone or in combination with one or more of the first through sixth aspects, the notification is provided by a modem of the UE to an application or user interface of the UE.

In an eighth additional aspect, alone or in combination with one or more of the first through seventh aspects, the process includes switching to the first RAT, after switching from the first RAT to the second RAT, based at least in part on a timer.

In a ninth additional aspect, alone or in combination with one or more of the first through eighth aspects, a length of the timer is based at least in part on a session start time associated with the broadcast/multicast application.

In a tenth additional aspect, alone or in combination with one or more of the first through ninth aspects, the length of the timer is shorter after the session start time than before the session start time.

In an eleventh additional aspect, alone or in combination with one or more of the first through tenth aspects, the length of the timer is shorter at a first time than at a second time, the first time and the second time are before the session start time, and the first time is closer to the session start time than the second time.

In a twelfth additional aspect, alone or in combination with one or more of the first through eleventh aspects, a length of the timer is based at least in part on whether stored information indicates whether a cell that covers the UE and is associated with the second RAT is associated with broadcast/multicast coverage.

In a thirteenth additional aspect, alone or in combination with one or more of the first through twelfth aspects, the process includes switching, after switching from the first RAT to the second RAT, to the first RAT based at least in part on a cell change of the UE.

Although FIG. 11 shows example blocks of a process, in some aspects, the process may include additional blocks, fewer blocks, different blocks, or differently arranged blocks than those depicted in FIG. 11. Additionally or alternatively, two or more of the blocks of the process may be performed in parallel.

Figure 12:
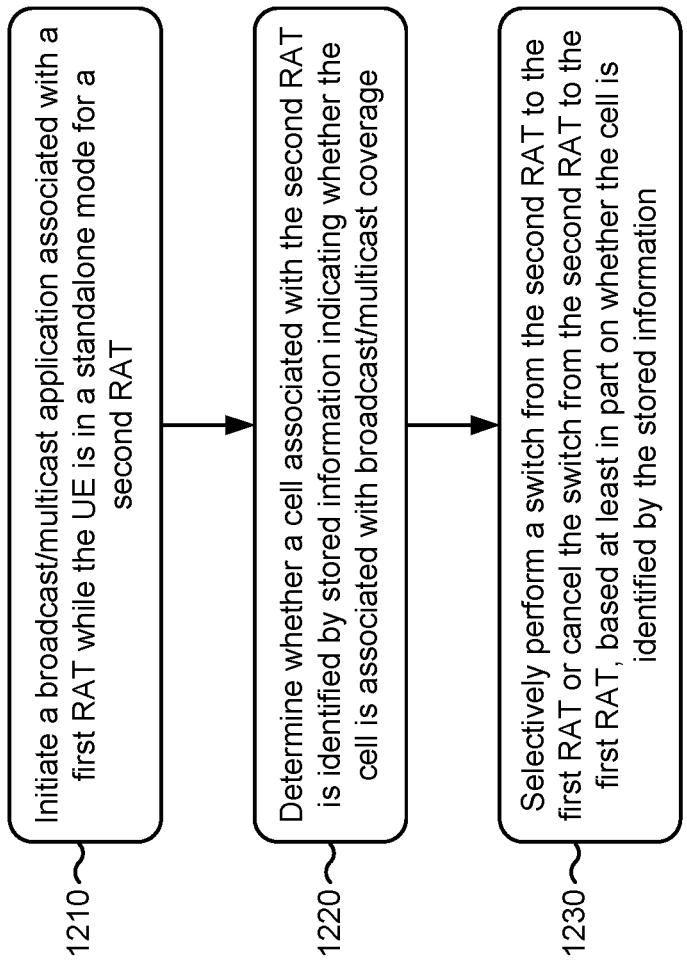
FIG. 12 shows a flowchart illustrating an example process performed by a UE in accordance with various aspects of the present disclosure.

FIG. 12 shows a flowchart illustrating an example process performed, for example, by a UE in accordance with various aspects of the present disclosure. The example process shown in FIG. 12 is an example where a UE (for example, UE 120) performs operations relating to switching between RATs in connection with a broadcast or multicast communication.

As shown in FIG. 12, in some aspects, the process may include initiating a broadcast/multicast application associated with a first RAT while the UE is in a standalone mode for a second RAT (block 1210). For example, the UE (for example, using antenna 252, DEMOD 254, MIMO detector 256, receive processor 258, or controller/processor 280) may initiate a broadcast/multicast application associated with a first RAT while the UE is in a standalone mode for a second RAT, as described above.

As shown in FIG. 12, in some aspects, the process may include determining whether a cell associated with the second RAT is identified by stored information indicating whether the cell is associated with broadcast/multicast coverage (block 1220). For example, the UE (for example, using receive processor 258, transmit processor 264, controller/processor 280, or memory 282) may determine whether a cell associated with the second RAT is identified by stored information indicating whether the cell is associated with broadcast/multicast coverage, as described above.

As shown in FIG. 12, in some aspects, the process may include selectively performing a switch from the second RAT to the first RAT or cancelling the switch from the second RAT to the first RAT, based at least in part on whether the cell is identified by the stored information (block 1230). For example, the UE (for example, using receive processor 258, transmit processor 264, controller/processor 280, or memory 282) may selectively perform a switch from the second RAT to the first RAT, or may cancel the switch from the second RAT to the first RAT. The UE may determine whether to perform the switch or cancel the switch based at least in part on whether the cell is identified by the stored information, as described above.

The process may include additional aspects, such as any single aspect or any combination of aspects described below or in connection with one or more other processes described elsewhere herein.

In a first additional aspect, the method includes determining that the cell is not identified by the stored information, wherein performing a switch from the second RAT to the first RAT or cancelling the switch from the second RAT to the first RAT includes cancelling the switch from the second RAT to the first RAT based at least in part on the cell not being identified by the stored information.

In a second additional aspect, alone or in combination with the first aspect, the method includes disabling the broadcast/multicast application based at least in part on the cell not being identified by the stored information.

In a third additional aspect, alone or in combination with one or more of the first and second aspects, the method includes providing a notification regarding the broadcast/multicast application.

In a fourth additional aspect, alone or in combination with one or more of the first through third aspects, determining whether the cell associated with the second RAT is identified by the stored information includes determining that the cell is identified by the stored information, and selectively performing a switch from the second RAT to the first RAT or cancelling the switch from the second RAT to the first RAT includes performing the switch from the second RAT to the first RAT based at least in part on the cell being identified by the stored information.

In a fifth additional aspect, alone or in combination with one or more of the first through fourth aspects, the stored information identifies cells associated with the second RAT that are associated with a broadcast/multicast system information block (SIB) transmitted via a cell associated with the first RAT.

In a sixth additional aspect, alone or in combination with one or more of the first through fifth aspects, the broadcast/multicast SIB comprises a SIB13 or a SIB15.

In a seventh additional aspect, alone or in combination with one or more of the first through sixth aspects, the stored information identifies cells associated with the second RAT that are not associated with a broadcast/multicast system information block (SIB) transmitted via a cell associated with the first RAT.

In an eighth additional aspect, alone or in combination with one or more of the first through sixth aspects, the process includes determining that a broadcast/multicast SIB is not received via the cell associated with the first RAT within a threshold time; and adding information identifying the cell associated with the second RAT to the stored information.

Although FIG. 12 shows example blocks of the process, in some aspects, the process may include additional blocks, fewer blocks, different blocks, or differently arranged blocks than those depicted in FIG. 12. Additionally or alternatively, two or more of the blocks of the process may be performed in parallel.

Figure 13:
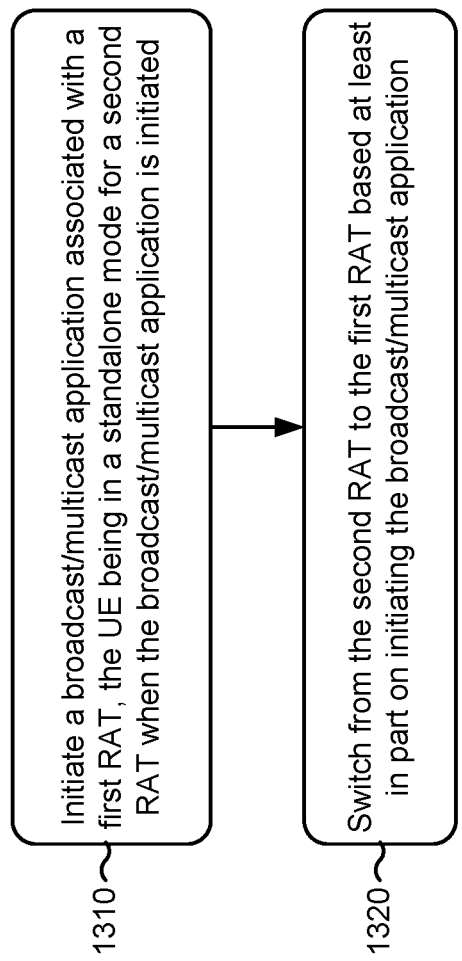
FIG. 13 shows a flowchart illustrating an example process performed by a UE in accordance with various aspects of the present disclosure.

FIG. 13 is a diagram illustrating an example process performed, for example, by a user equipment, in accordance with various aspects of the present disclosure. The example process shows where a UE (such as UE 120 or the like) performs operations associated with broadcast or multicast support for 5G standalone mode.

As shown in FIG. 13, in some aspects, the process may include initiating a broadcast/multicast application associated with a first RAT, the UE being in a standalone mode for a second RAT when the broadcast/multicast application is initiated (block 1310). For example, the UE (for example, using receive processor 258, transmit processor 264, controller/processor 280, memory 282, or the like) may initiate a broadcast/multicast application associated with a first RAT. The UE may be in a standalone mode for a second RAT when the broadcast/multicast application is initiated, as described above.

As further shown in FIG. 13, in some aspects, the process may include switching from the second RAT to the first RAT based at least in part on initiating the broadcast/multicast application (block 1320). For example, the UE (for example, using receive processor 258, transmit processor 264, controller/processor 280, memory 282, or the like) may switch from the second RAT to the first RAT based at least in part on initiating the broadcast/multicast application, as described above.

The process may include additional aspects, such as any single implementation or any combination of aspects described below or in connection with one or more other processes described elsewhere herein.

In a first aspect, switching from the second RAT to the first RAT based at least in part on initiating the broadcast/multicast application includes blocking a PLMN of the second RAT.

In a second aspect, alone or in combination with the first aspect, the UE may unblock the PLMN of the second RAT based at least in part on determining that the broadcast/multicast application is no longer in use.

In a third aspect, alone or in combination with any one or more of the first aspect and the second aspect, switching from the second RAT to the first RAT based at least in part on initiating the broadcast/multicast application includes locally releasing a connection associated with the second RAT.

In a fourth aspect, alone or in combination with any one or more of the first through third aspects, the UE may provide an indication to deactivate the broadcast/multicast application based at least in part on determining that system information for the broadcast/multicast application is not received within a time window after initiating the broadcast/multicast application.

In a fifth aspect, alone or in combination with any one or more of the first through fourth aspects, the UE may monitor for system information for the broadcast/multicast application on a network associated with the first RAT after switching from the second RAT to the first RAT.

In a sixth aspect, alone or in combination with any one or more of the first through fifth aspects, the UE may transmit a broadcast/multicast interest indication to a base station associated with the first RAT based at least in part on detecting a temporary mobile group identity.

In a seventh aspect, alone or in combination with any one or more of the first through sixth aspects, switching from the second RAT to the first RAT comprises deactivating the standalone mode for the second RAT of the UE.

In an eighth aspect, alone or in combination with any one or more of the first through seventh aspects, switching from the second RAT to the first RAT comprises triggering a tracking area update that indicates that the standalone mode for the second RAT is not supported or that the UE does not have a 5G/NR capability for the standalone mode for the second RAT.

In a ninth aspect, alone or in combination with any one or more of the first through eighth aspects, switching from the second RAT to the first RAT includes triggering a tracking area update that indicates to enable the standalone mode for the second RAT or that indicates a 5G/NR capability after the broadcast/multicast application is deactivated and after switching from the second RAT to the first RAT.

In a tenth aspect, alone or in combination with any one or more of the first through ninth aspects, the UE may trigger a tracking area update that indicates to enable the standalone mode for the second RAT or that indicates a 5G capability after the broadcast/multicast application is deactivated and after switching from the second RAT to the first RAT.

In an eleventh aspect, alone or in combination with any one or more of the first through tenth aspects, switching from the second RAT to the first RAT further includes lowering a priority value of the second RAT to a zero or sub-zero value to trigger the switch from the second RAT to the first RAT.

In a twelfth aspect, alone or in combination with any one or more of the first through eleventh aspects, the UE may switch from the first RAT to the second RAT based at least in part on the broadcast/multicast application being deactivated.

In a thirteenth aspect, alone or in combination with any one or more of the first through twelfth aspects, the UE may switch from the first RAT to the second RAT based at least in part on an out-of-service state, a radio link failure state, or a high-priority mobile network search.

In a fourteenth aspect, alone or in combination with any one or more of the first through thirteenth aspects, the UE may receive, from a base station associated with the second RAT, system information that indicates a frequency, of the first RAT, associated with a broadcast/multicast service.

In a fifteenth aspect, alone or in combination with any one or more of the first through fourteenth aspects, the system information is associated with the first RAT.

In a sixteenth aspect, alone or in combination with any one or more of the first through fifteenth aspects, the system information indicates one or more service area identities for the frequency associated with the broadcast/multicast service.

In a seventeenth aspect, alone or in combination with any one or more of the first through sixteenth aspects, switching from the second RAT to the first RAT is based at least in part on receiving the system information.

In an eighteenth aspect, alone or in combination with any one or more of the first through seventeenth aspects, the broadcast/multicast application is initiated based at least in part on receiving the system information or based at least in part on the system information indicating the frequency, of the first RAT, associated with the broadcast/multicast service.

In a nineteenth aspect, alone or in combination with any one or more of the first through eighteenth aspects, the UE may selectively switch to the second RAT, or remain on the first RAT, where the UE is to switch to the second RAT based at least in part on expiration of a timer after the broadcast/multicast application is deactivated, and where the UE is to remain on the first RAT when the broadcast/multicast application is deactivated and then enabled before expiration of the timer.

In a twentieth aspect, alone or in combination with any one or more of the first through nineteenth aspects, the UE may store mapping information identifying a broadcast/multicast service associated with the first RAT and a corresponding cell identifier associated with the second RAT, where the mapping information is stored based at least in part on detecting system information identifying the broadcast/multicast service while covered by a cell associated with the corresponding cell identifier.

In a twenty-first aspect, alone or in combination with any one or more of the first through twentieth aspects, the UE may identify the broadcast/multicast service associated with the corresponding cell identifier using the mapping information.

In a twenty-second aspect, alone or in combination with any one or more of the first through twenty-first aspects, switching from the second RAT to the first RAT based at least in part on initiating the broadcast/multicast application further comprises moving from a frequency associated with the second RAT to a frequency associated with the first RAT.

In a twenty-third aspect, alone or in combination with any one or more of the first through twenty-second aspects, the first RAT is a 4G/Long Term Evolution (LTE) RAT and the second RAT is a 5G/New Radio RAT.

Although FIG. 13 shows example blocks of a process, in some aspects, the process may include additional blocks, fewer blocks, different blocks, or differently arranged blocks than those depicted in FIG. 13. Additionally or alternatively, two or more of the blocks of the process may be performed in parallel.

Figure 14:
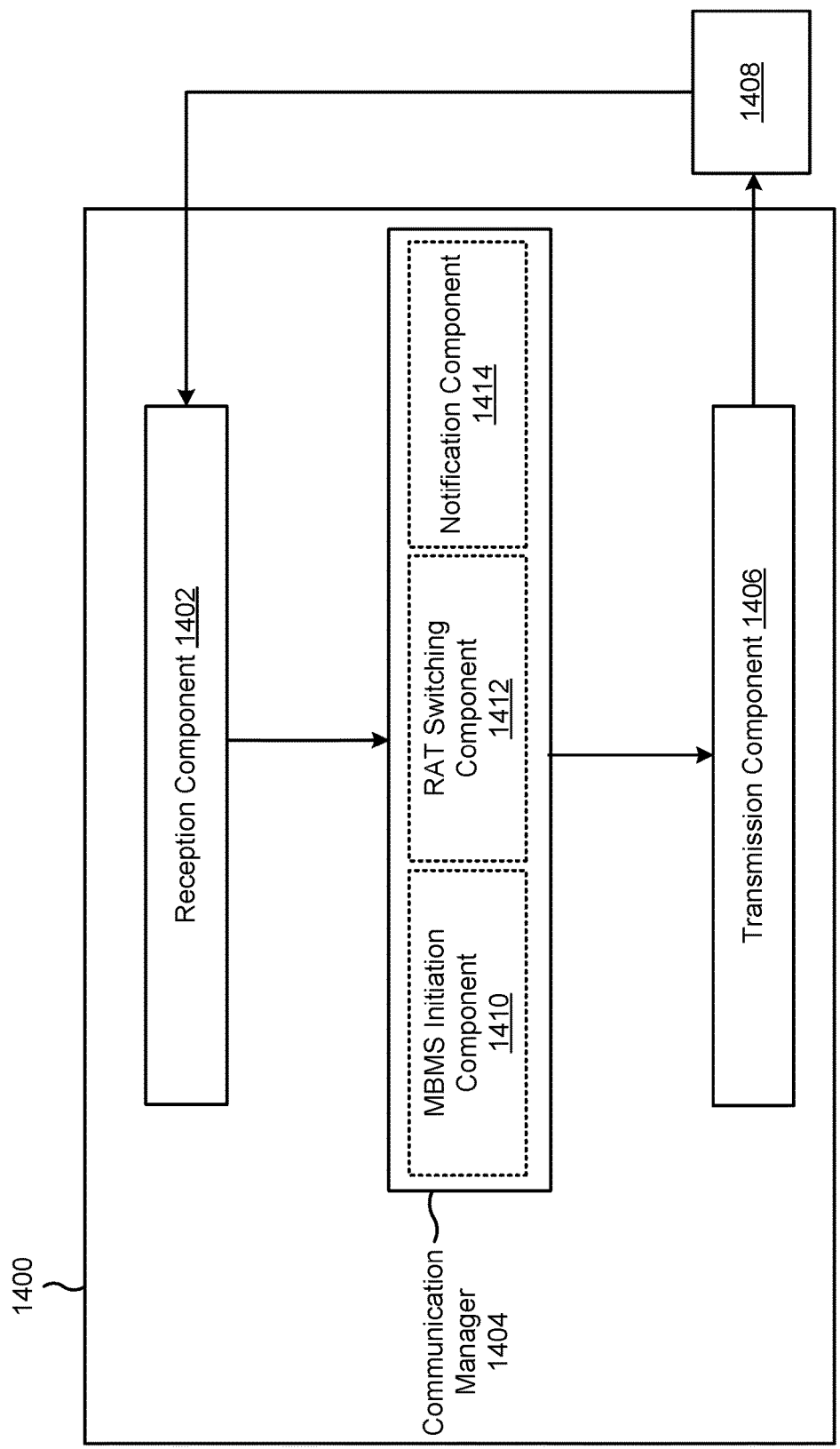
FIGS. 14 and 15 are block diagrams of example apparatuses for wireless communication in accordance with various aspects of the present disclosure.

FIG. 14 is a block diagram of an example apparatus 1400 for wireless communication in accordance with various aspects of the present disclosure. The apparatus 1400 may be a UE, or a UE may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, or another wireless communication device) using the reception component 1402 and the transmission component 1406.

In some aspects, the apparatus 1400 may be configured to perform one or more operations described herein in connection with FIGS. 3-10. Additionally or alternatively, the apparatus 1400 may be configured to perform one or more processes described herein, such as the process of FIG. 11. In some aspects, the apparatus 1400 may include one or more components of the UE described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the UE described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the UE described above in connection with FIG. 2. In some aspects, the transmission component 1406 may be co-located with the reception component 1402 in a transceiver.

The communication manager 1404 may initiate a broadcast/multicast application associated with a first RAT while the apparatus 1400 is in a standalone mode for a second RAT; switch from the second RAT to the first RAT based at least in part on initiating the broadcast/multicast application; and switch from the first RAT to the second RAT based at least in part on failing to detect a communication associated with the broadcast/multicast application using the first RAT. In some aspects, the communication manager 1404 may include a controller/processor, a memory, or a combination thereof, of the UE described above in connection with FIG. 2.

In some aspects, the communication manager 1404 may include a set of components, such as an MBMS initiation component 1410, a RAT switching component 1412, a notification component 1414, or a combination thereof. Alternatively, the set of components may be separate and distinct from the communication manager 1404. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The MBMS initiation component 1410 may initiate a broadcast/multicast application associated with a first RAT while the apparatus 1400 is in a standalone mode for a second RAT. The RAT switching component 1412 may cause the apparatus 1400 to switch between the first RAT and the second RAT. For example, the RAT switching component 1412 may switch from the second RAT to the first RAT based at least in part on initiating the broadcast/multicast application, or may switch from the first RAT to the second RAT based at least in part on failing to detect a communication associated with the broadcast/multicast application using the first RAT. In some aspects, the RAT switching component 1412 may switch from the first RAT to the second RAT based at least in part on failing to detect the communication within a defined time period. In some aspects, the RAT switching component 1412 may switch to the first RAT, after switching from the first RAT to the second RAT, based at least in part on a timer. In some aspects, the RAT switching component 1412 may switch, after switching from the first RAT to the second RAT, to the first RAT based at least in part on a cell change of the UE. The notification component 1414 may provide a notification based at least in part on failing to detect the communication. In some aspects, the notification component 1414 may provide a notification based at least in part on switching from the first RAT to the second RAT.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
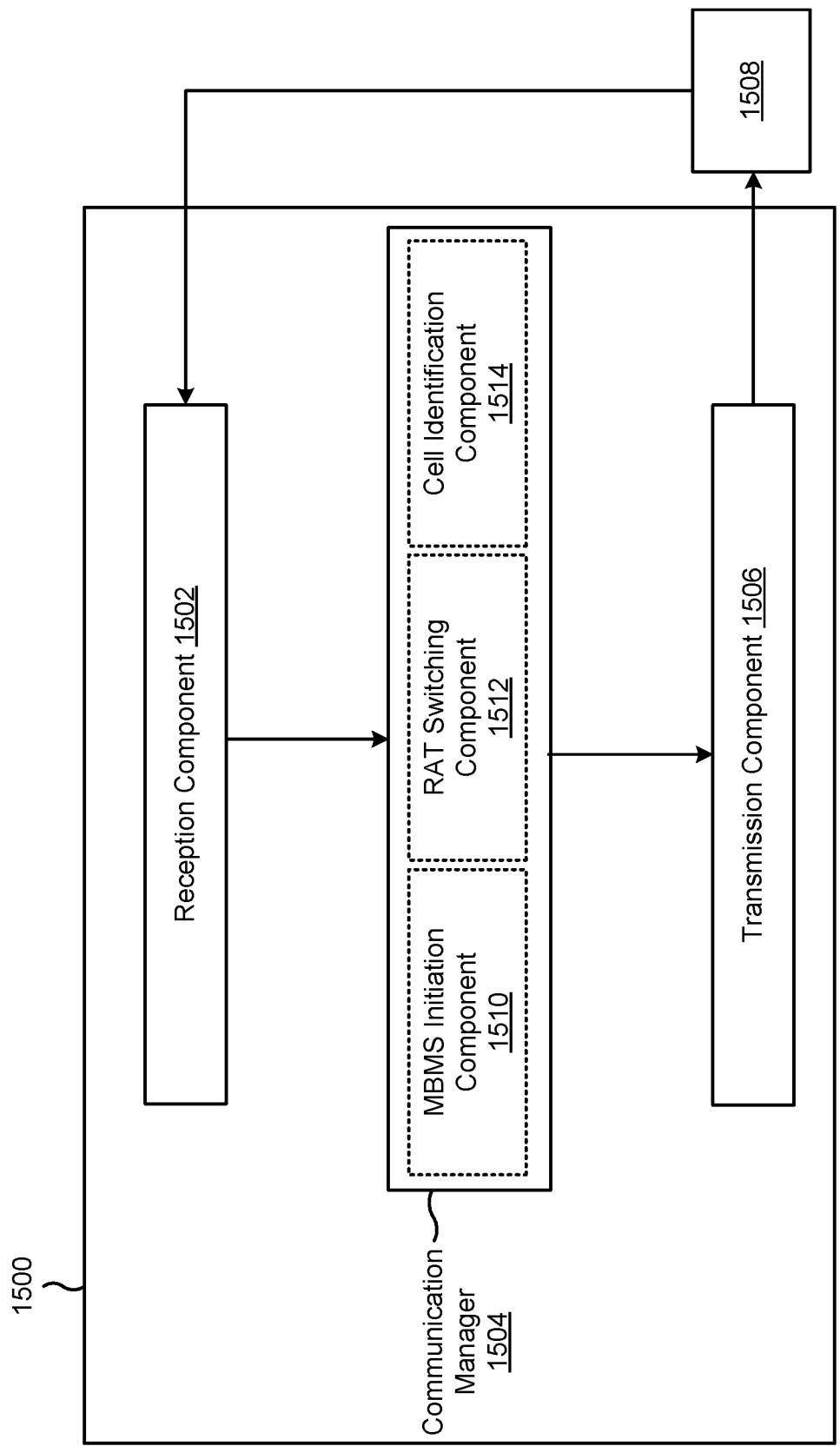

FIG. 15 is a block diagram of an example apparatus 1500 for wireless communication in accordance with various aspects of the present disclosure. The apparatus 1500 may be a UE, or a UE may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as a UE, a base station, or another wireless communication device) using the reception component 1502 and the transmission component 1506.

In some aspects, the apparatus 1500 may be configured to perform one or more operations described herein in connection with FIGS. 3-10. Additionally or alternatively, the apparatus 1500 may be configured to perform one or more processes described herein, such as the process of FIG. 12. In some aspects, the apparatus 1500 may include one or more components of the UE described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the UE described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the UE described above in connection with FIG. 2. In some aspects, the transmission component 1506 may be co-located with the reception component 1502 in a transceiver.

The communication manager 1504 may initiate a broadcast/multicast application associated with a first RAT while the apparatus 1500 is in a standalone mode for a second RAT; determine whether a cell associated with the second RAT is identified by stored information indicating whether the cell is associated with broadcast/multicast coverage; and selectively perform a switch from the second RAT to the first RAT or cancel the switch from the second RAT to the first RAT, based at least in part on whether the cell is identified by the stored information. In some aspects, the communication manager 1504 may include a controller/processor, a memory, or a combination thereof, of the UE described above in connection with FIG. 2.

In some aspects, the communication manager 1504 may include a set of components, such as an MBMS initiation component 1510, a RAT switching component 1512, a cell identification component 1514, or a combination thereof. Alternatively, the set of components may be separate and distinct from the communication manager 1504. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The MBMS initiation component 1510 may initiate a broadcast/multicast application associated with a first RAT while the UE is in a standalone mode for a second RAT. The cell identification component 1514 may determine whether a cell associated with the second RAT is identified by stored information indicating whether the cell is associated with broadcast/multicast coverage. The RAT switching component 1512 may selectively perform a switch from the second RAT to the first RAT or cancel the switch from the second RAT to the first RAT, based at least in part on whether the cell is identified by the stored information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A user equipment (UE) for wireless communication, comprising:
 a memory; and
 one or more processors coupled to the memory, the one or more processors configured to:
  launch a broadcast or multicast (broadcast/multicast) application associated with a first radio access technology (RAT) while the UE is in a standalone mode for a second RAT;
  switch from the second RAT to the first RAT based at least in part on the launch of the broadcast/multicast application;
  provide a notification based at least in part on a failure to detect a communication associated with the broadcast/multicast application using the first RAT; and
  switch from the first RAT to the second RAT based at least in part on:
   the failure to detect the communication associated with the broadcast/multicast application using the first RAT, and
   reception of an interaction associated with the notification.

2. The UE of claim 1, wherein the communication associated with the broadcast/multicast application using the first RAT comprises a system information block associated with the broadcast/multicast application using the first RAT.

3. The UE of claim 1, wherein the one or more processors, to switch from the first RAT to the second RAT based at least in part on failing the failure to detect the communication associated with the broadcast/multicast application using the first RAT, are configured to switch from the first RAT to the second RAT based at least in part on failing a failure to detect the communication within a defined time period.

4. The UE of claim 3, wherein a length of the defined time period is based at least in part on stored information indicating whether a cell that covers the UE and is associated with the second RAT is associated with broadcast/multicast coverage.

5. The UE of claim 1, wherein the notification is provided by a modem of the UE to an application or user interface of the UE.

6. The UE of claim 1, wherein the notification is a first notification and the one or more processors are configured to provide a second notification based at least in part on the switch from the first RAT to the second RAT.

7. The UE of claim 6, wherein the one or more processors are configured to cause a modem of the UE to provide the second notification to an application or user interface of the UE.

8. The UE of claim 1, wherein the one or more processors are configured to switch to the first RAT, after the switch from the first RAT to the second RAT, based at least in part on a timer.

9. The UE of claim 8, wherein a length of the timer is based at least in part on a session start time associated with the broadcast/multicast application.

10. The UE of claim 9, wherein the length of the timer is shorter after the session start time than before the session start time.

11. The UE of claim 9, wherein the length of the timer is shorter at a first time than at a second time, wherein the first time and the second time are before the session start time, and wherein the first time is closer to the session start time than the second time.

12. The UE of claim 8, wherein a length of the timer is based at least in part on whether stored information indicates whether a cell that covers the UE and is associated with the second RAT is associated with broadcast/multicast coverage.

13. The UE of claim 1, wherein the one or more processors are configured to switch, after the switch from the first RAT to the second RAT, to the first RAT based at least in part on a cell change of the UE.

14. A method of wireless communication performed by a user equipment (UE), comprising:
   launching a broadcast or multicast (broadcast/multicast) application associated with a first radio access technology (RAT) while the UE is in a standalone mode for a second RAT;
   switching from the second RAT to the first RAT based at least in part on launching the broadcast/multicast application;
   providing a notification based at least in part on failing to detect a communication associated with the broadcast/multicast application using the first RAT; and
   switching from the first RAT to the second RAT based at least in part on:
      the failing to detect the communication associated with the broadcast/multicast application using the first RAT, and
      receiving an interaction associated with the notification.

15. The method of claim 14, wherein switching from the first RAT to the second RAT based at least in part on failing to detect the communication associated with the broadcast/multicast application using the first RAT comprises switching from the first RAT to the second RAT based at least in part on failing to detect the communication within a defined time period.

16. The method of claim 14, further comprising switching to the first RAT, after the switching from the first RAT to the second RAT, based at least in part on at least one of a timer or a cell change of the UE.

17. A non-transitory computer-readable medium storing a set of instructions for wireless communication, the set of instructions comprising:
   one or more instructions that, when executed by one or more processors of a user equipment (UE), cause the UE to:
      launch a broadcast or multicast (broadcast/multicast) application associated with a first radio access technology (RAT) while the UE is in a standalone mode for a second RAT;
      switch from the second RAT to the first RAT based at least in part on the launch of the broadcast/multicast application;
      provide a notification based at least in part on a failure to detect a communication associated with the broadcast/multicast application using the first RAT; and
      switch from the first RAT to the second RAT based at least in part on:
         the failure to detect the communication associated with the broadcast/multicast application using the first RAT, and
         reception of an interaction associated with the notification.

18. The non-transitory computer-readable medium of claim 17, wherein the communication associated with the broadcast/multicast application using the first RAT comprises a system information block associated with the broadcast/multicast application using the first RAT.

19. The non-transitory computer-readable medium of claim 17, wherein the one or more instructions, that cause the UE to switch from the first RAT to the second RAT based at least in part on the failure to detect the communication associated with the broadcast/multicast application using the first RAT, cause the UE to switch from the first RAT to the second RAT based at least in part on a failure to detect the communication within a defined time period.

20. The non-transitory computer-readable medium of claim 17, wherein the notification is a first notification and the one or more instructions further cause the UE to provide a second notification based at least in part on the switch from the first RAT to the second RAT.

21. The non-transitory computer-readable medium of claim 17, wherein the one or more instructions further cause the UE to switch to the first RAT, after the switch from the first RAT to the second RAT, based at least in part on a timer.

22. The non-transitory computer-readable medium of claim 17, wherein the one or more instructions further cause the UE to switch, after the switch from the first RAT to the second RAT, to the first RAT based at least in part on a cell change of the UE.

23. An apparatus for wireless communication, comprising:
   means for launching a broadcast or multicast (broadcast/multicast) application associated with a first radio access technology (RAT) while the apparatus is in a standalone mode for a second RAT;

means for switching from the second RAT to the first RAT based at least in part on launching the broadcast/multicast application;

means for providing a notification based at least in part on failing to detect a communication associated with the broadcast/multicast application using the first RAT; and means for switching from the first RAT to the second RAT based at least in part on:
   failing to detect the communication associated with the broadcast/multicast application using the first RAT, and
   receiving an interaction associated with the notification.

24. The apparatus of claim 23, wherein the communication associated with the broadcast/multicast application using the first RAT comprises a system information block associated with the broadcast/multicast application using the first RAT.

25. The apparatus of claim 23, wherein means for switching from the first RAT to the second RAT based at least in part on failing to detect a communication associated with the broadcast/multicast application using the first RAT comprises:
   means for switching from the first RAT to the second RAT based at least in part on failing to detect the communication within a defined time period.

26. The apparatus of claim 23, wherein the notification is a first notification, and further comprising means for providing a second notification based at least in part on switching from the first RAT to the second RAT.

* * * * *